United States Patent
Maeda

(10) Patent No.: US 9,020,264 B2
(45) Date of Patent: Apr. 28, 2015

(54) IMAGE MANAGEMENT DEVICE, IMAGE MANAGEMENT METHOD, PROGRAM, RECORDING MEDIUM, AND INTEGRATED CIRCUIT

(75) Inventor: Kazuhiko Maeda, Osaka (JP)

(73) Assignee: Panasonic Intellectual Property Corporation of America, Torrance, CA (US)

(*) Notice: Subject to any disclaimer, the term of this patent is extended or adjusted under 35 U.S.C. 154(b) by 361 days.

(21) Appl. No.: 13/636,810

(22) PCT Filed: Nov. 16, 2011

(86) PCT No.: PCT/JP2011/006398
§ 371 (c)(1),
(2), (4) Date: Sep. 24, 2012

(87) PCT Pub. No.: WO2012/101697
PCT Pub. Date: Aug. 2, 2012

(65) Prior Publication Data
US 2013/0010154 A1 Jan. 10, 2013

(30) Foreign Application Priority Data
Jan. 26, 2011 (JP) .................................. 2011-014069

(51) Int. Cl.
*G06K 9/00* (2006.01)
*G06F 17/30* (2006.01)

(52) U.S. Cl.
CPC ................ *G06F 17/30259* (2013.01)

(58) Field of Classification Search
CPC .................................................. G06F 17/30259
USPC .................................................. 382/181, 225
See application file for complete search history.

(56) References Cited

U.S. PATENT DOCUMENTS 6,748,097 B1\* 6/2004 Gindele et al. ................. 382/112
2005/0246623 A1\* 11/2005 Ma et al. ..................... 715/501.1

(Continued)

FOREIGN PATENT DOCUMENTS

JP        5-233717     9/1993
JP        2007-49387   2/2007

(Continued)

OTHER PUBLICATIONS

International Search Report issued Feb. 28, 2012 in corresponding International Application No. PCT/JP2011/006398.
Sepandar D. Kamvar et al., "Exploiting the Block Structure of the Web for Computing PageRank", 2003.

*Primary Examiner* — Samir Ahmed
(74) *Attorney, Agent, or Firm* — Wenderoth, Lind & Ponack, L.L.P.

(57) ABSTRACT

An image management device clusters acquired images (S201) and generates blocks by grouping the images (S202). Next, the image management device calculates an intra-block importance degree of each cluster in each generated block (S204), calculates cluster importance degrees by accumulating the calculated intra-block importance degrees of each cluster (S205), and calculates an image importance degree based on the calculated cluster importance degrees (S206).

17 Claims, 37 Drawing Sheets

(56) References Cited

U.S. PATENT DOCUMENTS

| | | | |
|---|---|---|---|
| 2006/0204120 A1* | 9/2006 | Poon et al. | 382/254 |
| 2007/0239778 A1* | 10/2007 | Gallagher | 707/104.1 |
| 2010/0271395 A1 | 10/2010 | Isogai et al. | |
| 2011/0142300 A1* | 6/2011 | Zhang et al. | 382/118 |
| 2012/0050789 A1* | 3/2012 | Bachman et al. | 358/1.15 |

FOREIGN PATENT DOCUMENTS

| | | |
|---|---|---|
| JP | 2007-183825 | 7/2007 |
| JP | 2007-287014 | 11/2007 |
| JP | 2010-262531 | 11/2010 |
| WO | 2010/041377 | 4/2010 |

* cited by examiner

Object information

| Object ID | Cluster ID | Image ID | Occupation degree |
|---|---|---|---|
| 1 | 1 | 1 | 10% |
| 2 | 1 | 2 | 12% |
| 3 | 2 | 2 | 6% |
| 4 | 2 | 3 | 3% |
| 5 | 3 | 4 | 13% |
| ... | ... | ... | ... |

Block information

| Image ID | Block ID |
|---|---|
| 1 | 1 |
| 2 | 1 |
| 3 | 1 |
| 4 | 2 |
| 5 | 2 |
| 6 | – |
| 7 | 2 |
| 8 | 3 |
| 9 | 3 |
| 10 | – |

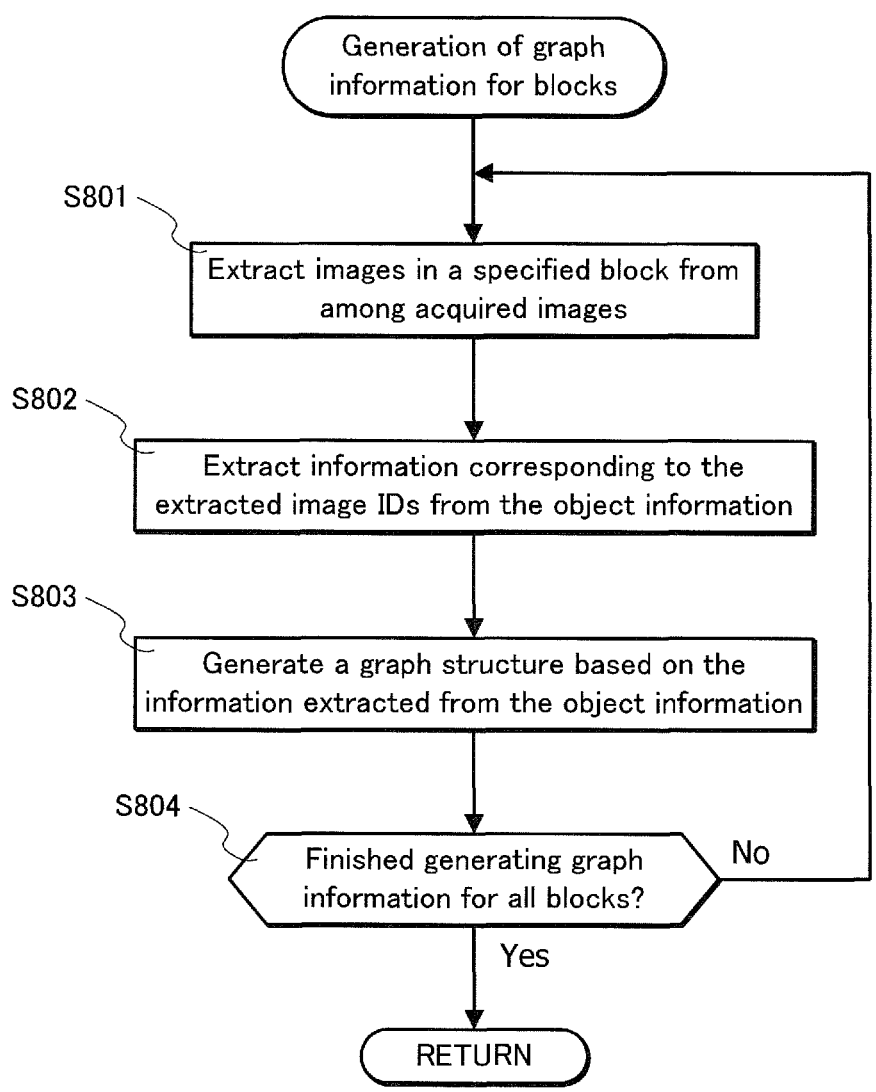

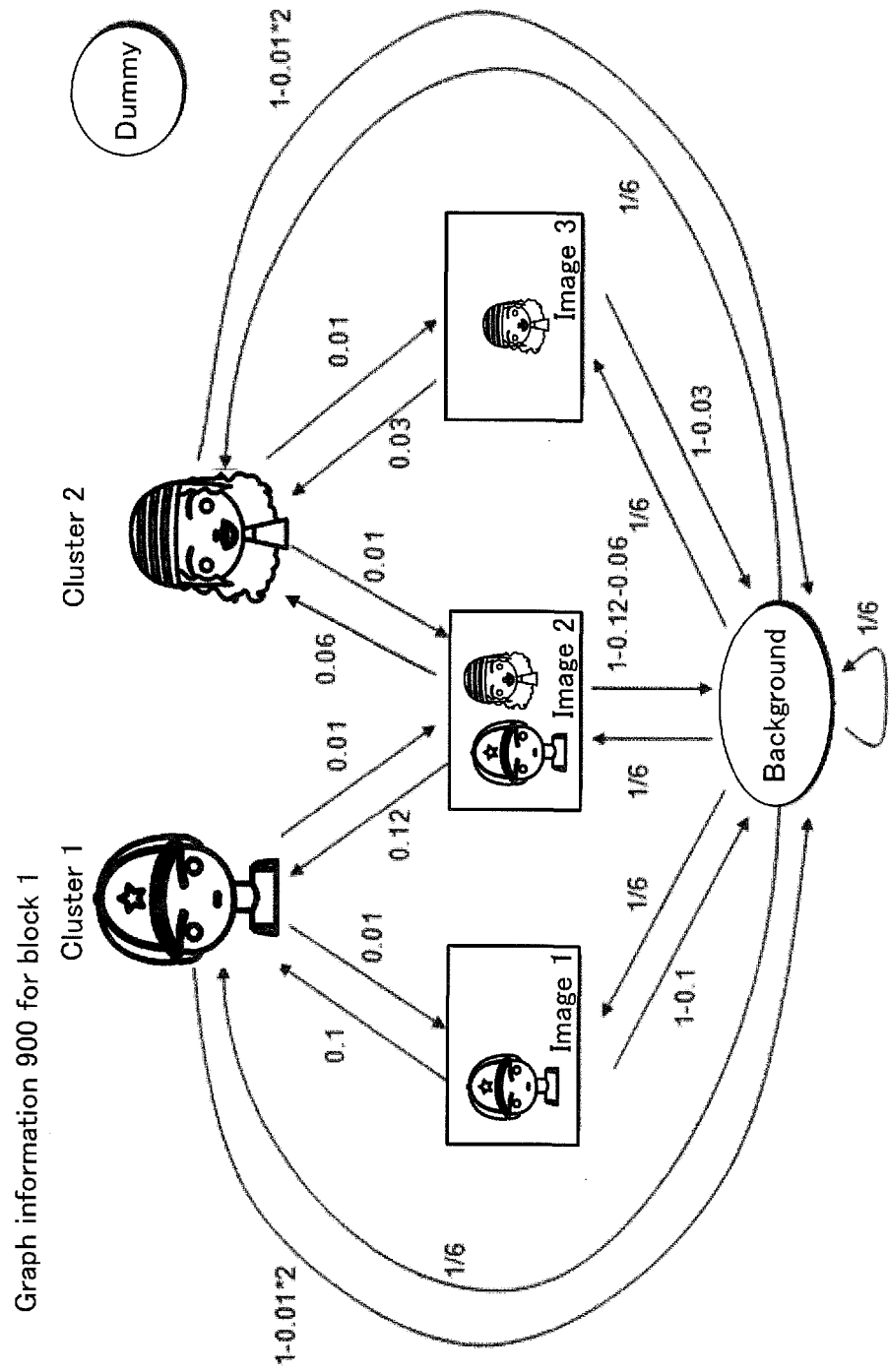

FIG.11

Probability transition matrix M 1100

|  | Image 1 | Image 2 | Image 3 | Cluster 1 | Cluster 2 | Dummy | Background |
|---|---|---|---|---|---|---|---|
| Image 1 | 0 | 0 | 0 | 0.01 | 0 | 0 | 1/6 |
| Image 2 | 0 | 0 | 0 | 0.01 | 0.01 | 0 | 1/6 |
| Image 3 | 0 | 0 | 0 | 0 | 0.01 | 0 | 1/6 |
| Cluster 1 | 0.1 | 0.12 | 0.03 | 0 | 0 | 0 | 1/6 |
| Cluster 2 | 0 | 0.06 | 0 | 0 | 0 | 0 | 1/6 |
| Dummy | 0 | 0 | 0 | 0 | 0 | 0 | 0 |
| Background | 0.9 | 0.82 | 0.97 | 0.98 | 0.98 | 0 | 1/6 |

FIG.12

Random walk matrix X 1200

|  | Image 1 | Image 2 | Image 3 | Cluster 1 | Cluster 2 | Dummy | Background |
|---|---|---|---|---|---|---|---|
| Image 1 | 1/7 | 1/7 | 1/7 | 1/7 | 1/7 | 1/7 | 1/7 |
| Image 2 | 1/7 | 1/7 | 1/7 | 1/7 | 1/7 | 1/7 | 1/7 |
| Image 3 | 1/7 | 1/7 | 1/7 | 1/7 | 1/7 | 1/7 | 1/7 |
| Cluster 1 | 1/7 | 1/7 | 1/7 | 1/7 | 1/7 | 1/7 | 1/7 |
| Cluster 2 | 1/7 | 1/7 | 1/7 | 1/7 | 1/7 | 1/7 | 1/7 |
| Dummy | 1/7 | 1/7 | 1/7 | 1/7 | 1/7 | 1/7 | 1/7 |
| Background | 1/7 | 1/7 | 1/7 | 1/7 | 1/7 | 1/7 | 1/7 |

FIG.13

Eigenvector 1300

$$\begin{pmatrix} 0.3 \\ 0.4 \\ 0.1 \\ 0.22 \\ 0.15 \\ 0.01 \\ 0.8 \end{pmatrix}$$

FIG.14

Eigenvector 1400 after
conversion to probability vector $$\begin{pmatrix} 0.152 \\ 0.202 \\ 0.051 \\ 0.111 \\ 0.076 \\ 0.005 \\ 0.404 \end{pmatrix}$$

FIG.15

Intra-block importance
degree information
1500

| Node | Importance degree |
|---|---|
| Image 1 | 0.152 |
| Image 2 | 0.202 |
| Image 3 | 0.051 |
| Cluster 1 | 0.111 |
| Cluster 2 | 0.076 |
| Dummy | 0.005 |
| Background | 0.404 |

Intra-block importance degrees 1503 in block 3
Intra-block importance degrees 1502 in block 2
Intra-block importance degrees 1501 in block 1

Cluster importance degree information

| Cluster | Importance degree |
|---------|-------------------|
| 1       | 0.742             |
| 2       | 0.497             |
| 3       | 0.920             |
| ...     | ...               |

Image importance degree information

| Image | Importance degree |
|-------|-------------------|
| 1     | 0.00772           |
| 2     | 0.01299           |
| 3     | 0.00527           |
| ...   | ...               |

Image ranking information

| Rank | Image | Importance degree |
|---|---|---|
| 1 | 2 | 0.01299 |
| 2 | 8 | 0.01234 |
| 3 | 1 | 0.00772 |
| ... | ... | ... |

FIG.33
(a)
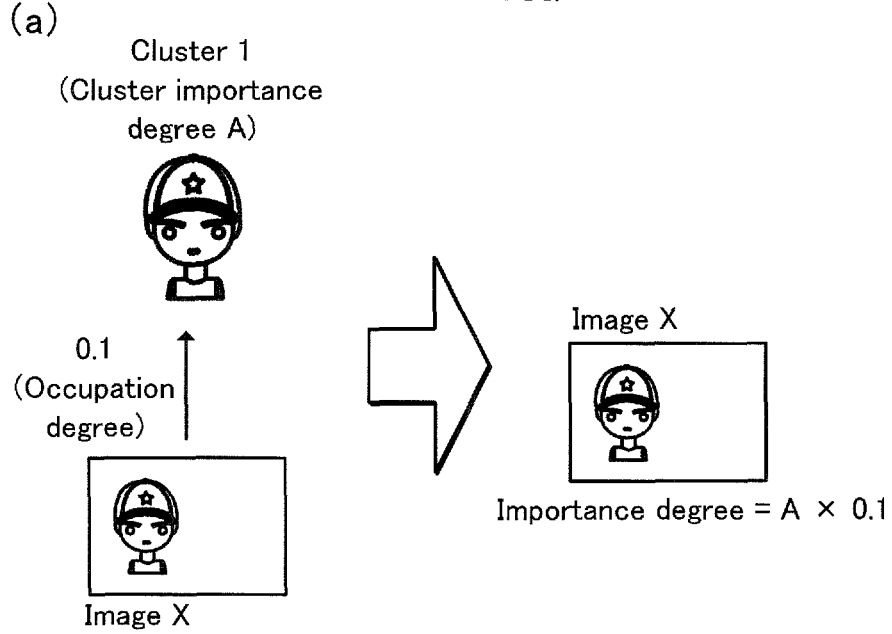
(b)
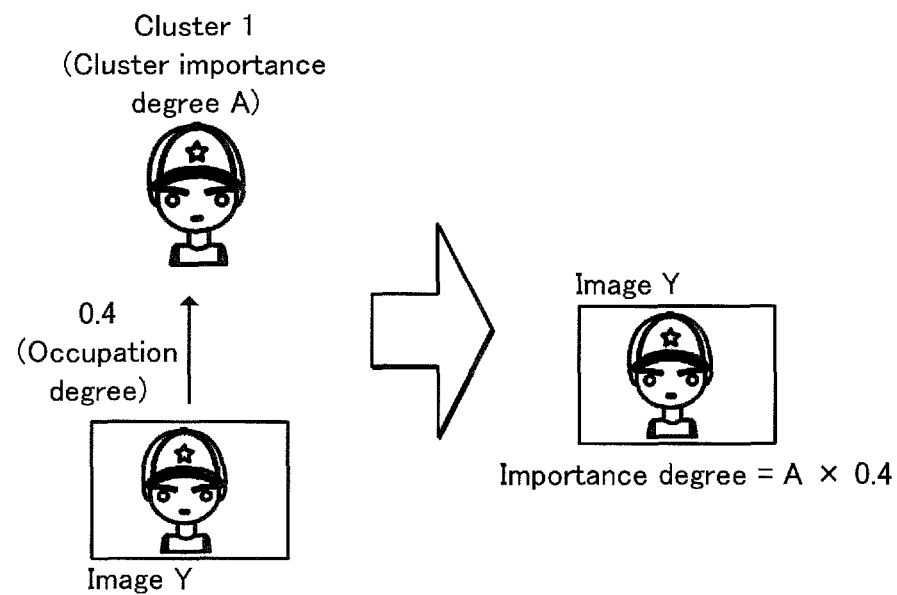

FIG.35

S3501: Acquire the feature values and the importance degrees

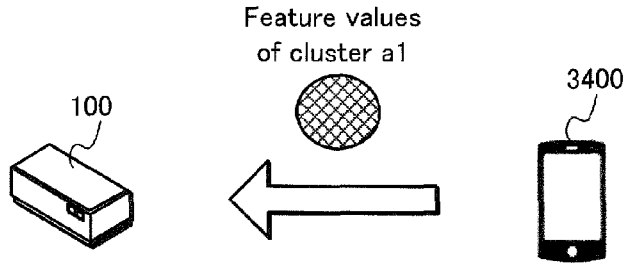

S3502: Compare the feature values of each categorized cluster with the acquired feature values

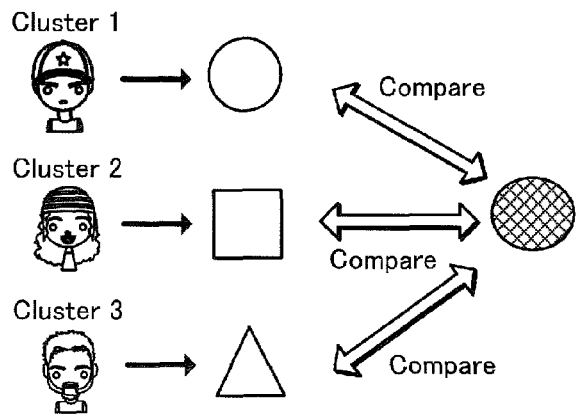

S3503: Identify the corresponding cluster

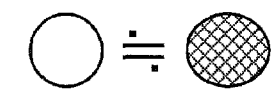

Cluster 1 = cluster a1

S3504: Create a correspondence table of IDs (share IDs)

| Device 100 | Device 3400 |
|---|---|
| ID:1 | ID:a1 |
| ID:··· | ID:··· |

S3505: Acquire the external importance degree of the cluster with a corresponding ID

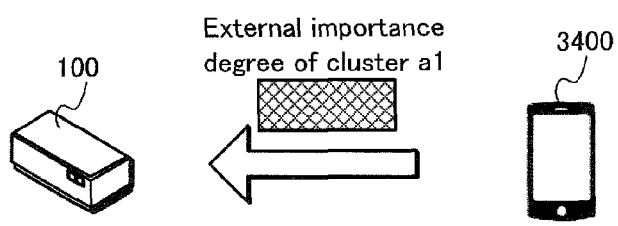

IMAGE MANAGEMENT DEVICE, IMAGE MANAGEMENT METHOD, PROGRAM, RECORDING MEDIUM, AND INTEGRATED CIRCUIT

TECHNICAL FIELD

The present invention relates to technology for ranking images and objects included in images.

BACKGROUND ART

In recent years, due to the spread of digital cameras, users now store an enormous number of images. As the number of stored images grows large, however, it becomes difficult for users to select important images.

It therefore becomes necessary to rank images in order of importance to the user to allow the user to search efficiently for a desired image.

Displaying images after ranking them helps the user to easily select the necessary image.

Known technology for ranking includes technology for determining the degree of importance of pages based on links between pages on web sites (see Patent Literature 1 and Non-Patent Literature 1).

CITATION LIST

Patent Literature

Patent Literature 1: Japanese Patent Application Publication No. 2007-183825

Non-Patent Literature

Non-Patent Literature 1: "Exploiting the Block Structure of the Web for Computing PageRank". D. Kamvar, H. Haveliwala, D. Manning, H. Golub, 2003.

SUMMARY OF INVENTION

Technical Problem

As a ranking method that considers images with people that are important to a user as important photographs, the inventors have considered a method to connect images and people appearing in the images (people being a type of object) via a link structure and to calculate the importance degree of images, as well as the importance degree of people, based on the link structure.

This method generates image nodes each indicating an image and person nodes each indicating a person. When a specific person appears in an image, a bi-directional link is established between the image node and the person node.

In this context, an inter-node link means that the importance degree of the node at the source of the link propagates over the link to the node at the target of the link. The importance degree of a node that is linked to by a plurality of other nodes is the sum of the importance degrees propagated over all of the links. Furthermore, the importance degree of a node that is linked to by a node with a high importance degree increases.

Accordingly, the importance degree of a person node that is linked to by a large number of image nodes increases. In other words, the importance degree of a person appearing in a large number of images increases.

Furthermore, the importance degree of an image node that is linked to by a person node with a high importance degree increases. In other words, the importance degree of an image increases if a person with a high importance degree appears in the image.

By thus creating a link structure and allowing importance degrees to propagate, images that include a person appearing in a large number of images have a higher importance degree.

Furthermore, in order to calculate the importance degree with this method, a probability transition matrix is created based on the inter-node link structure between all of the image nodes and person nodes. The importance degree of an image is then calculated by seeking the eigenvector of the matrix. The eigenvector represents the convergence value when the importance degree of each node has continued propagating.

With this method, however, the resource load to perform matrix calculation grows exceedingly large with an increasing number of images and people for which the importance degree is being calculated.

In other words, the number of rows and columns in the probability transition matrix is the sum of the number of image nodes and the number of person nodes. Therefore, when the number of images grows large, the probability transition matrix also becomes immense.

As an example, if the number of images is 1,000,000, and the number of people is 1,000, the probability transition matrix has approximately 1,001,000 rows by 1,001,000 columns.

In particular, it is difficult for a consumer device to store such a massive matrix in memory and perform calculations thereon. This problem is not limited to methods that use matrix calculation, but rather occurs generally in methods that perform calculations based on the relationship between individual elements.

Note that in Patent Literature 1 and Non-Patent Literature 1, the link structure is divided into a plurality of groups in advance. An inter-group importance degree is first calculated before calculating the intra-group importance degree, thereby lessening the calculation load.

With these conventional technologies, however, the target for calculating the importance degree is a web site, with no reference being made to when the target is an image or an object appearing in an image.

The present invention has been conceived in light of this background, and it is an object thereof to calculate the importance degree of an image and an object appearing in the image while reducing the resource load.

Solution to Problem

In order to solve the above problems, an image management device according to the present invention is for ranking a plurality of images based on importance degrees thereof, comprising: an image acquisition unit configured to acquire a plurality of images; a detection unit configured to detect, in each of the images acquired by the image acquisition unit, any objects included therein; an extraction unit configured to extract image feature values of each detected object; a clustering unit configured to categorize each detected object into one of a plurality of clusters based on the image feature values of the detected objects; a block generation unit configured to generate a plurality of blocks by grouping the images acquired by the image acquisition unit into blocks; an intra-block importance degree calculation unit configured to calculate, for each of the blocks, an intra-block importance degree of each of the clusters to which an object in an image in the block belongs based on a relationship between the image and the cluster; a cluster importance degree calculation unit configured to calculate a cluster importance degree of each of the clusters in the images by accumulating the intra-block importance degrees calculated for each of the clusters in each of the blocks; and an image importance degree calculation unit configured to calculate an image importance degree of each of the images based on the calculated cluster importance degrees.

Advantageous Effects of Invention

The image management device according to the present invention calculates the cluster importance degrees in each block composed of a smaller number of images than the number of acquired images, thereby contributing to lessening the resource load.

The block generation unit may assign a block ID to each of the images to identify the block into which each of the images is grouped. The image management device may further comprise a block information storage unit for storing the block ID assigned to each of the images. When the image acquisition unit newly acquires images, the block generation unit may group the newly acquired images into blocks without grouping images whose block ID is stored in the block information storage unit.

With this structure, images whose block ID is stored in the block information storage unit, i.e. images that have already been grouped into blocks are not targeted for new grouping into blocks. This reduces the recalculation, necessitated by the new grouping, of intra-block importance degrees of clusters by the intra-block importance degree calculation unit.

The block generation unit may assign a block ID to each of the images to identify the block into which each of the images is grouped. The image management device may further comprise a block information storage unit for storing the block ID assigned to each of the images. When the image acquisition unit newly acquires images, the block generation unit may group both a portion of the images whose block ID is stored in the block information storage unit and the newly acquired images into blocks.

This structure contributes to flexible optimization of grouping into blocks in response to the processing capabilities of the image management device.

The image management device may further comprise a graph generation unit configured to create, for each block, an image node for each image in the block, a cluster node for each cluster to which each object in the image belongs, and a background node indicating a background of the image, to set a value for a link between each created node, and to generate a graph from each created node and the value set for each link. The intra-block importance degree calculation unit may calculate the intra-block importance degree of the image and the cluster of each node based on the generated graph.

The intra-block importance degree calculation unit may generate a probability transition matrix based on the graph generated by the graph generation unit and calculate an eigenvector of the probability transition matrix for calculation, for each of the blocks, of the image importance degree and the intra-block importance degree of the clusters.

The graph generation unit may create a dummy node for inclusion in the graph and set the value of the link between the dummy node and each image node, between the dummy node and each cluster node, and between the dummy node and the background node to zero.

The intra-block importance degree calculation unit may correct the generated probability transition matrix based on a matrix indicated by a random walk and calculate the eigenvector of the corrected probability transition matrix.

The cluster importance degree calculation unit may adjust the intra-block importance degree of each cluster in each block by subtracting the intra-block importance degree of the dummy node in the block from the intra-block importance degree of the cluster in the block.

The intra-block importance degrees of clusters in each block can be considered to have a fixed importance degree added thereon, and the intra-block importance degree of the dummy node can be considered the importance degree that is added on.

Accordingly, in each block, the actual intra-block importance degrees of clusters can be calculated for each block by subtracting the intra-block importance degree of the dummy node from the intra-block importance degree of each cluster.

In particular, this prevents the cluster importance degree from varying depending on the method of grouping into blocks.

The image management device may further comprise an importance degree normalization unit configured to normalize the intra-block importance degree, calculated by the cluster importance degree calculation unit, of each cluster in each block based on the intra-block importance degree of the dummy node in each block. The cluster importance degree calculation unit may calculate the cluster importance degrees in the images based on the normalized intra-block importance degree of each cluster.

This structure prevents the cluster importance degree in a plurality of images from varying depending on the method of grouping into blocks.

The cluster importance degree calculation unit may calculate the cluster importance degrees in the images by summing, for each cluster, the calculated intra-block importance degree of the cluster in each block.

The image management device may further comprise an importance degree normalization unit configured to normalize the cluster importance degrees, calculated by the cluster importance degree calculation unit, in each block based on a total number of images and a total number of clusters included in the block. The cluster importance degree calculation unit may sum the normalized cluster importance degrees.

This structure allows for adjustment between blocks of the actual intra-block importance degree of clusters, even if the number of images included in a block or the number of clusters is not even between blocks.

The clustering unit may be further configured to acquire, from an external device, feature values of clusters categorized by the external device and to compare the acquired feature values with feature values of categorized clusters so as to identify a cluster, among the categorized clusters, to which the acquired feature values correspond. The cluster importance degree calculation unit may acquire the cluster importance degree of the identified cluster from the external device and use the acquired cluster importance degree during the accumulation.

The block generation unit may determine a size of each of the blocks to be generated based on resource information showing resources useable for block generation and generate each of the blocks to be the determined size.

The resource information may indicate a size of available memory.

An image management method according to the present invention is for ranking a plurality of images based on importance degrees thereof, comprising the steps of: acquiring a plurality of images; detecting, in each of the acquired images, any objects included therein; extracting image feature values of each detected object; categorizing each detected object into one of a plurality of clusters based on the image feature values of the detected objects; generating a plurality of blocks by grouping the acquired images into blocks; calculating, for each of the blocks, an intra-block importance degree of each of the clusters to which an object in an image in the block belongs based on a relationship between the image and the cluster; calculating a cluster importance degree of each of the clusters in the images by accumulating the intra-block importance degrees calculated for each of the clusters in each of the blocks; and calculating an image importance degree of each of the images based on the calculated cluster importance degrees.

A program according to the present invention is for causing a computer to perform processing that includes image management steps, the image management steps comprising: acquiring a plurality of images; detecting, in each of the acquired images, any objects included therein; extracting image feature values of each detected object; categorizing each detected object into one of a plurality of clusters based on the image feature values of the detected objects; generating a plurality of blocks by grouping the acquired images into blocks; calculating, for each of the blocks, an intra-block importance degree of each of the clusters to which an object in an image in the block belongs based on a relationship between the image and the cluster; calculating a cluster importance degree of each of the clusters in the images by accumulating the intra-block importance degrees calculated for each of the clusters in each of the blocks; and calculating an image importance degree of each of the images based on the calculated cluster importance degrees.

A recording medium according to the present invention has recorded thereon the above program.

An integrated circuit according to the present invention is for ranking a plurality of images based on importance degrees thereof, comprising: an image acquisition unit configured to acquire a plurality of images; a detection unit configured to detect, in each of the images acquired by the image acquisition unit, any objects included therein; an extraction unit configured to extract image feature values of each detected object; a clustering unit configured to categorize each detected object into one of a plurality of clusters based on the image feature values of the detected objects; a block generation unit configured to generate a plurality of blocks by grouping the images acquired by the image acquisition unit into blocks; an intra-block importance degree calculation unit configured to calculate, for each of the blocks, an intra-block importance degree of each of the clusters to which an object in an image in the block belongs based on a relationship between the image and the cluster; a cluster importance degree calculation unit configured to calculate a cluster importance degree of each of the clusters in the images by accumulating the intra-block importance degrees calculated for each of the clusters in each of the blocks; and an image importance degree calculation unit configured to calculate an image importance degree of each of the images based on the calculated cluster importance degrees.

BRIEF DESCRIPTION OF DRAWINGS

FIG. 5 illustrates an example of object information 500.

FIG. 7 illustrates an example of block information.

FIG. 8 is a flowchart illustrating details on processing for generating graph information for blocks.

FIG. 9A illustrates an example of graph information 900 for block 1.

FIG. 11 illustrates an example of a probability transition matrix M 1100.

FIG. 12 illustrates an example of a random walk matrix X 1200.

FIG. 13 illustrates an example of an eigenvector 1300.

FIG. 14 illustrates an example of an eigenvector 1400 after conversion to a probability vector.

FIG. 15 illustrates an example of intra-block importance degree information 1500.

FIG. 21 illustrates an example of cluster importance degree information 2100.

FIG. 23 illustrates an example of image importance degree information 2300.

FIG. 24 illustrates an example of image ranking information.

FIG. 33 illustrates a method for calculating image importance degrees from cluster importance degrees.

FIG. 35 provides a general idea of processing.

DESCRIPTION OF EMBODIMENTS

Embodiment 1

With reference to the drawings, the following describes an image management device 100 and a control method for the image management device 100 according to Embodiment 1.

Figure 1:
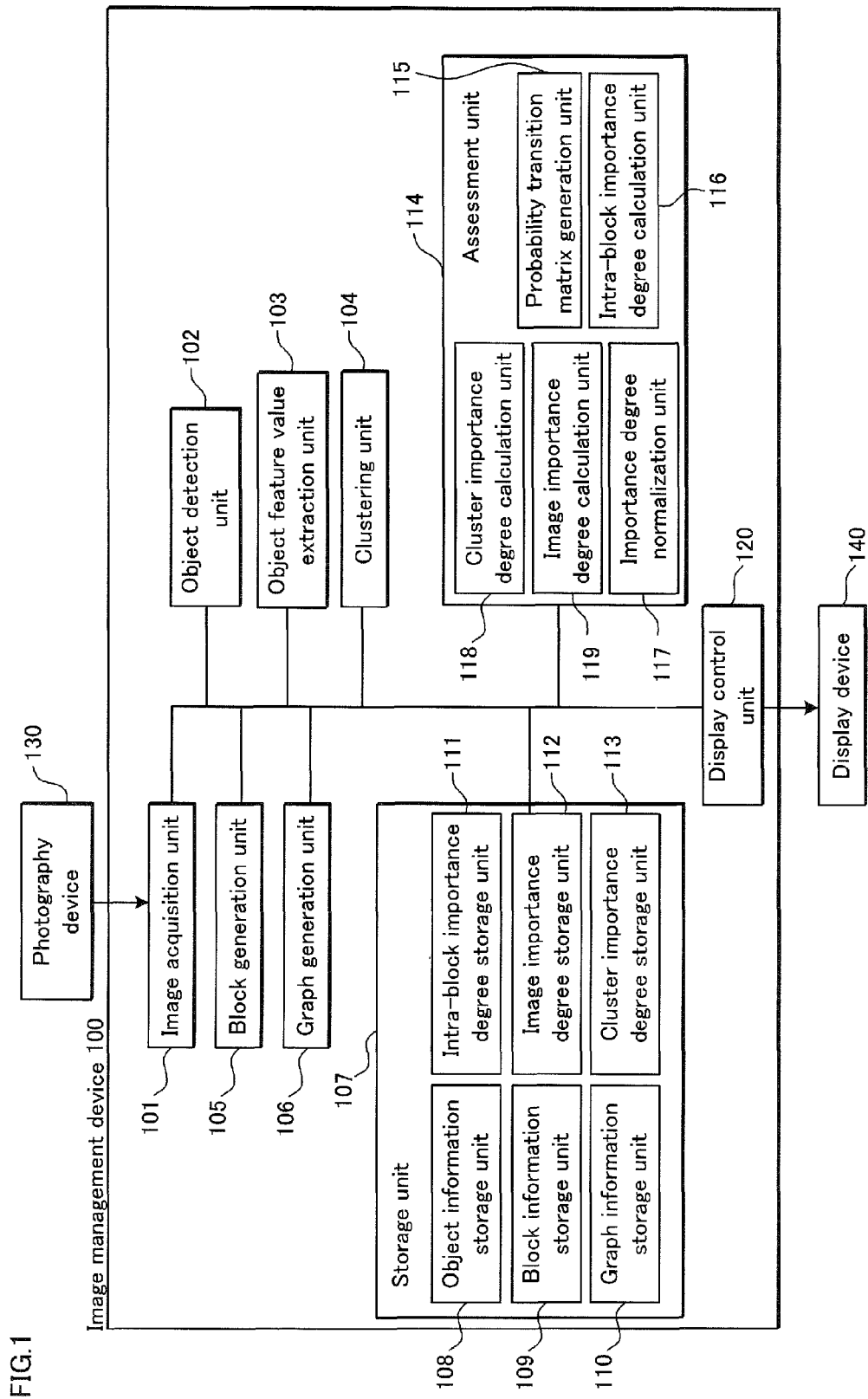
FIG. 1 is a functional block diagram of an image management device 100 in Embodiment 1.

FIG. 1 is a block diagram that includes the image management device 100 of Embodiment 1 as well as the connection to related devices.

The image management device 100 is connected to a photography device 130 and a display device 140.

The photography device 130 can photograph images and store photographed images. The image referred to here may, for example, be a still image such as a photograph, or the image may be a moving image. The photography device 130 is composed of a digital camera, for example.

Note that the image management device 100 and the photography device 130 are connected by a USB (Universal Serial Bus) cable, for example.

The display device 140 is, for example, composed of a digital television and displays video images, such as images output by the image management device 100. The display device 140 is connected to the image management device 100 by an HDMI (High-Definition Multimedia Interface) cable, for example.

Next, the internal structure of the image management device 100 is described with reference to FIG. 1.

As shown in FIG. 1, the image management device 100 includes an image acquisition unit 101, an object detection unit 102, an object feature value extraction unit 130, a clustering unit 104, a block generation unit 105, a graph generation unit 106, a storage unit 107, an assessment unit 114, and a display control unit 120.

The image acquisition unit 101 acquires images stored by the photography device 130 and assigns each acquired image a unique image ID.

The image acquisition unit 101 is, for example, composed of a USB port into which a USB cable is inserted and of software for controlling an interface, such as a USB driver.

The object detection unit 102 detects regions (image coordinates) of objects in images acquired by the image acquisition unit 101 and assigns a unique object ID to each detected object.

In this context, and object refers for example to a person's face or to a general object (car, house, food, etc.). The following explanation, however, focuses on an example of a person's face as an object.

The object detection unit 102 also calculates the ratio of the size of an object to the size of the image (hereinafter referred to as an "occupation degree").

The object feature value extraction unit 103 extracts the image feature values of a face detected in an image by the object detection unit 102.

The image feature values indicate features of a distribution of pixel values for a plurality of pixels in an image. For example, the image feature values are a vector whose components are a plurality of values indicating features of the image. Image features include the periodicity and orientation of the distribution of pixel values in image data as obtained using a Gabor filter. In the case of image feature values for a person's face, components may include the distance between two points recognized as eyes, the distance between a point recognized as a nose and a point recognized as a mouth, and the like, the points being recognized based on the periodicity and orientation of the distribution of pixel values.

The clustering unit 104 categorizes similar faces into the same cluster based on the facial image feature values extracted by the object feature value extraction unit 103.

In other words, faces categorized into the same cluster by the clustering unit 104 are provided with the same cluster ID. Based on the result of clustering, facial images in the same cluster can be confirmed as having similar image feature values. The K-Means method may, for example, be used as the clustering method.

Note that the above explanation has been kept simple since generic facial recognition technology or the like may be used for the methods performed by the object feature value extraction unit 103 and the clustering unit 104.

From among the acquired images, the block generation unit 105 extracts only images with faces and groups the extracted images into a number of blocks.

The method of grouping is not particularly limited. In the present embodiment, however, images are grouped so that, insofar as possible, the number of images in each block is equivalent. After grouping the images, the block generation unit 105 assigns a block ID to each extracted image in order to identify the block into which the image was grouped.

The graph generation unit 106 has a function to perform the following processes (1) through (3) on each block generated by the block generation unit 105.

(1) Node Creation

First, the graph generation unit 106 generates an image node for each image included in a block, a cluster node indicating the cluster for each person included in the images, one background node indicating the background of the images, and a dummy node.

(2) Setting of Inter-Node Link Values

Next, the graph generation unit 106 sets the values of the links between the created nodes. These links are used to propagate the importance degrees of the nodes. Specifically, the importance degree of the node at the target of a link is the importance degree of the node at the source of the link multiplied by the value of the link. For example, suppose that the importance degree of a node A is 1, a link is established between node A and node B, and the value of the link is 0.1. In this case, the importance degree of node B is 1×0.1, which equals 0.1. Furthermore, when a node is linked to from a plurality of other nodes, the importance degree of the node is the sum of these values. Details on this setting are provided below.

(3) Generation of a Graph Composed of Nodes and Link Values

The graph generation unit 106 then generates a graph representing the created nodes and the values of the links that have been set.

The storage unit 107 includes the following sub-blocks: an object information storage unit 108, a block information storage unit 109, a graph information storage unit 110, an intra-block importance degree storage unit 111, an image importance degree storage unit 112, and a cluster importance degree storage unit 113. The storage unit 107 is, for example, composed of RAM (Random Access Memory).

Details on the information stored by the storage units 108 through 113 are provided below.

The assessment unit 114 includes the following sub-blocks: a probability transition matrix generation unit 115, an intra-block importance degree calculation unit 116, an importance degree normalization unit 117, a cluster importance degree calculation unit 118, and an image importance degree calculation unit 119.

The probability transition matrix generation unit 115 generates a probability transition matrix based on graph information generated by the graph generation unit.

The intra-block importance degree calculation unit 116 calculates the intra-block importance degree for the image and cluster nodes in the probability transition matrix by calculating the eigenvector of the probability transition matrix. Note that a typical method, such as power iteration, is used as the method of calculating the eigenvector.

The importance degree normalization unit 117 has a function to adjust the importance degree between blocks so that the final importance degree does not change depending on the method for grouping into blocks. Specifically, the intra-block importance degree is normalized, for example, based on the number of nodes included in the block.

By accumulating the intra-block importance degree for each cluster normalized by the importance degree normalization unit 117, the cluster importance degree calculation unit 118 calculates the importance degree of each cluster for the images acquired by the image acquisition unit 101. Note that various methods of accumulation may be used, such as multiplication, addition, or a combination thereof. In the present embodiment, the importance degrees are added.

The image importance degree calculation unit 119 calculates the importance degree of an image based on the importance degrees of the clusters as calculated by the cluster importance degree calculation unit 118. For example, for image 1 included in cluster 1, the image importance degree calculation unit 119 calculates the importance degree of image 1 based on the importance degree of cluster 1.

The display control unit 120 has a function to cause, via an output interface such as an HDMI output terminal, the display device 140 to perform various types of display.

Figure 2:
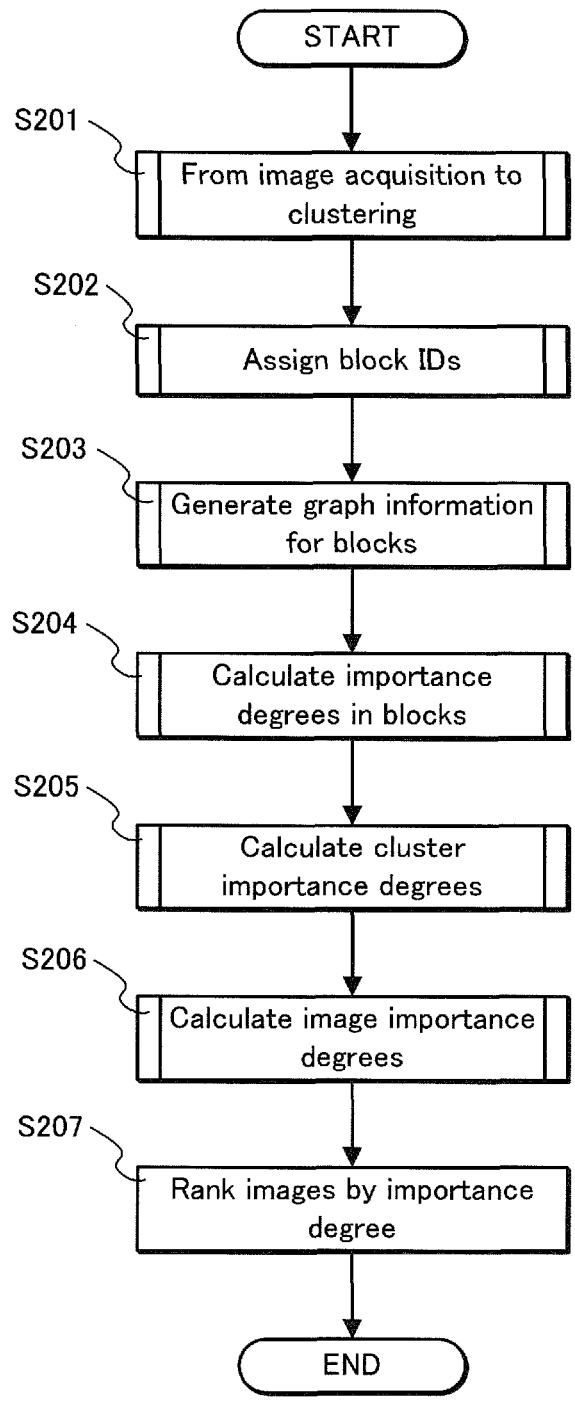
FIG. 2 is a flowchart showing the flow of processing from ranking, based on images acquired from a photography device 130, through display on a display device 140.

The following describes an overview of operations by the image management device 100 with reference to the flowchart in FIG. 2.

The flowchart in FIG. 2 shows operations to create an image ranging from a group of images input from the photography device 130 and to display the results on the display device 140.

Processing is performed in the following order. As shown in FIG. 2, the image management device 100 first detects objects in the acquired images and then clusters objects with similar feature values (S201). The image management device 100 then groups the acquired images into blocks of a constant number of images and assigns each block a block ID (S202). Next, the image management device 100 generates graph information representing the link structure of images included in the blocks and clusters included in the images (S203). The image management device 100 calculates the importance degree of each image and cluster in each block (S204). Subsequently, the image management device 100 calculates the cluster importance degrees based on the intra-block cluster importance degrees calculated for each block (S205). The image management device 100 then calculates the image importance degrees based on the cluster importance degrees (S206). Finally, the image management device 100 ranks images by image importance degree (S207). Details on each of these steps are provided below.

Figure 3:
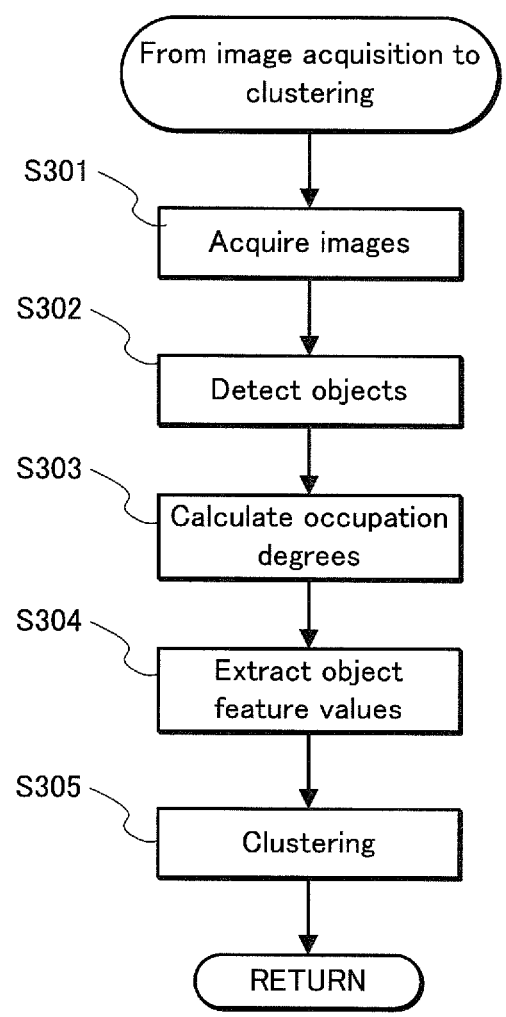
FIG. 3 is a flowchart illustrating details on processing from image acquisition through clustering.

FIG. 3 is a flowchart showing details on step S201 in FIG. 2, from image acquisition to clustering.

The image acquisition unit 101 acquires an image group stored by the photography device 130 (S301). At this point, the image acquisition unit 101 assigns each image an image ID that allows for unique identification of the image. Hereinafter, the images acquired in step S301 are also referred to as "acquired images".

Next, the object detection unit 102 detects objects included in the acquired images (S302).

Figure 4:
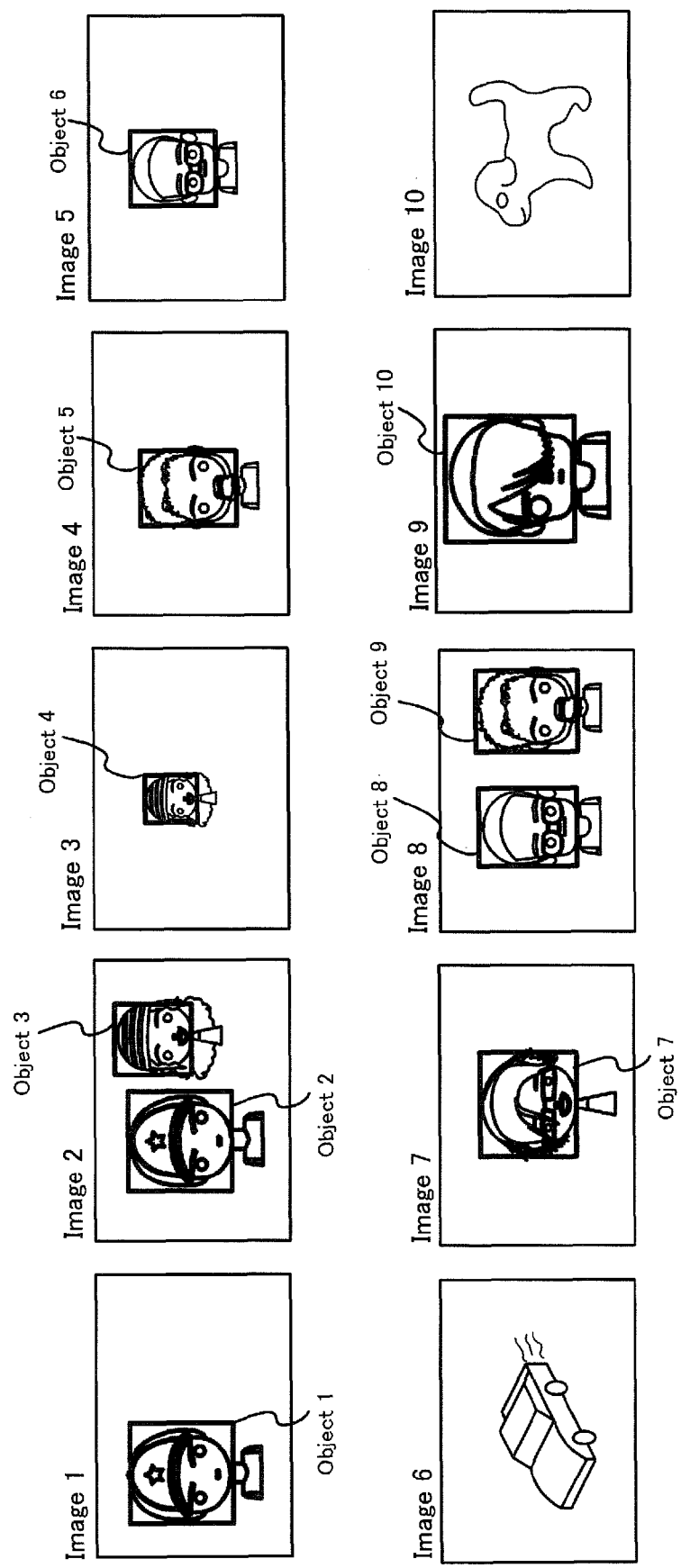
FIG. 4 illustrates an example of a group of images acquired from the photography device 130 and of objects included in the images.

FIG. 4 shows an example of acquired images and objects appearing in the images.

In this context, an object refers to a person's face. Each object is assigned a unique object ID.

For example, in image 1, object 1 (object ID of 1) has been detected. In image 2, objects 2 and 3 have been detected. In image 3, object 4 has been detected.

The method of detecting objects is, for example, a method to extract a facial region using a learning dictionary for extraction of prescribed facial regions.

Upon completion of object detection, the object detection unit 102 calculates the occupation degree of each detected object (S303).

The occupation degree represents the size that the object occupies within the entire image. For example, consider image 1 in FIG. 4, in which object 1 appears. If the size of image 1 is 600×400 and the size of the face in object 1 is 200×120, then the occupation degree of object 1 is (200×120)÷(600×400), which equals 10%. The occupation degree of each object in all of the images is calculated similarly.

The object feature value extraction unit 103 extracts the image feature values of each object detected by the object detection unit 102 (S304).

The clustering unit 104 then performs clustering based on the image feature values of the objects extracted by the object feature value extraction unit 103 (S305).

As described above, the method for clustering is, for example, the K-Means method based on image feature values.

In the example in FIG. 4, both of the following have similar image feature values.
  Object 1 appearing in image 1
  Object 2 appearing in image 2

Therefore, the clustering unit 104 assigns a cluster ID of cluster 1 to both objects 1 and 2.

FIG. 5 illustrates object information 500, which represents the results of the sequence of processing in FIG. 2.

As illustrated in FIG. 5, the object information 500 associates the following pieces of information: object ID, cluster ID, image ID, and occupation degree. The object information 500 is stored in the object information storage unit 108 within the storage unit 107.

Upon completion of these processes from image acquisition through clustering (FIG. 2: S201), processing proceeds to assignment of a cluster ID to each acquired image (S202).

Figure 6:
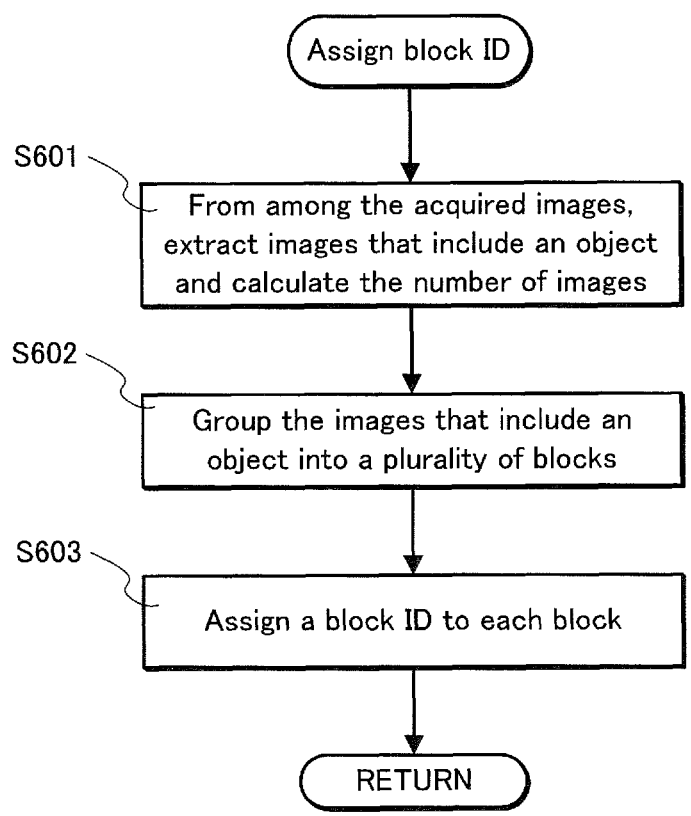
FIG. 6 is a flowchart illustrating details on processing to assign block IDs.

FIG. 6 shows details on this processing flow.

At this point, the acquired images are grouped into a plurality of blocks. Doing so reduces resources, such as memory, needed for calculating the importance degrees of objects during subsequent processing.

First, from among the acquired images, the block generation unit 105 extracts images that include objects based on the object information 500 (see FIG. 5) and calculates the number of extracted images (S601).

For example, in the example shown in FIG. 4, the number of images included in the image group is 10. Two of these images do not include an object: image 6 and image 10. In this case, the number of images that include an object is 10−2, which equals 8.

The number of images that include an object can thus be calculated by subtracting the number of images that do not include an object from the number of acquired images.

Next, the block generation unit 105 groups the images that include an object into a plurality of blocks (S602) and assigns a block ID to each block (S603).

The processing in steps S602 through S603 is, for example, performed by first prescribing an upper limit on the number of images per block, then arranging images by ascending image ID and assigning block IDs in ascending order, incrementing the block ID each time the upper limit is reached.

For example, if the upper limit is three, then for the eight images that include an object in FIG. 4, the block ID assigned to images 1 through 3 is block 1, to images 4, 5, and 7 is block 2, and to images 8 and 9 is block 3.

FIG. 7 illustrates block information 700 showing the results of assigning block IDs to images in this way. The block information 700 is stored in the block information storage unit 109 within the storage unit 107. Note that in FIG. 7, no block ID is assigned to images 6 or 10 because neither image includes an object.

Upon completion of this block ID assignment process (FIG. 2: S202), processing proceeds to generation of graph information for the blocks (S203).

FIG. 8 shows details on this processing flow.

Graph information refers to information necessary to calculate the importance degree of a block in a subsequent step, S204. This graph information includes nodes and the values of links between nodes.

These nodes include an image node for each image ID, as well as a cluster node for each cluster ID.

Furthermore, when a certain object appears in a certain image, a link is established from the image node for the image to the cluster node indicating the cluster to which the object belongs, and the value of the link is set in accordance with the occupation degree of the object in the image. Conversely, the link from the cluster node to the image node is set to return a constant value. In this way, the importance degree from each node propagates in accordance with the link value.

First, the graph generation unit 106 extracts images with a specified block ID from among acquired images (S801).

Next, the graph generation unit 106 extracts information corresponding to the extracted image IDs from the object information 500 (S802).

The following describes an example of steps S801 and S802. The graph generation unit 106 extracts images 1 through 3 in block 1 in step S801 and extracts the object IDs, cluster IDs, and occupation degrees corresponding to objects 1 through 3 from the object information 500 (see FIG. 5) in step S802.

Next, the graph generation unit 106 generates a graph structure based on the information extracted from the object information (S803) and stores the generated graph stereoscopic in the graph information storage unit 110 of the storage unit 107.

This generation step consists of two stages: (1) node creation, and (2) setting of links between the created nodes. The following describes these stages in order.

Node Creation

First, an image node is generated to indicate each image included in the block, and a person node is generated to indicate the cluster to which each object included in each image is assigned. A background node and a dummy node are also generated.

The background node represents the importance degree of the background included in the images. Specifically, the entire region in which no object is detected in an image is the background.

The dummy node is used to adjust the importance degree of the clusters in each block to an appropriate value. Details are provided below.

Setting of Links

A link is set from an image node to a person node in accordance with the occupation degree. Similarly, a link is set to the background node in accordance with the occupation degree of the background in an image.

Note that the occupation degree of the background is a value resulting from subtracting the occupation degree of every object from the entire image. For example, for image 2, the occupation degree of object 2 (12%) and the occupation degree of object 3 (6%) are subtracted from the entire image (100%) to yield an occupation degree for the background of 82% (i.e. 100−12−6).

In accordance with rules (1) through (6) below, the value of each link between nodes is set.

(1) The value of a link from an image node to a cluster node is the occupation degree of the cluster to which the object included in the image belongs.

(2) The value of a link from a cluster node to an image node is an arbitrary constant (such as 0.01).

(3) The value of a link from an image node to a background node is one minus the sum of the value of each link from the image node to a cluster node.

(4) The value of a link from a cluster node to the background node is one minus the sum of the value of each link from the cluster node to an image node.

(5) The values of links from the background node to nodes other than the dummy node are distributed evenly.

(6) No links to or from the dummy node exist (the value of such links is set to zero).

FIG. 9A illustrates graph information 900 for block 1.

The graph information 900 includes seven nodes and the values set for links between the nodes.

The seven nodes are composed of two cluster nodes indicating clusters 1 and 2, three image nodes indicating images 1 through 3, a background node, and a dummy node.

The value of each link is set in accordance with the above rules (1) through (6). For example, the links between image 1 and cluster 1 are explained as follows. The value of the link from image 1 to cluster 1 is 10%, or 0.1, which is the occupation degree of object 1 in image 1.

Such a value for a link serves as an index indicating how much the importance degree propagates. Specifically, this value may be used as follows: (importance degree of source of link)×(value of link)=(importance degree of target of link).

On the other hand, the link from cluster 1 to image 1 is a constant value of 0.01.

Furthermore, since the object belonging to cluster 1 is also included in image 2, a link is also established between the nodes for cluster 1 and image 2.

Links between nodes for images and clusters are established in this way.

Next, the background node is described. For example, the value of the link from the node for image 1 to the background node is one minus the sum 0.1 of the value of all of the links from image 1 to a cluster node. In other words, the value is 1−0.1, which equals 0.9.

Similarly, the value of the link from the node of cluster 1 to the background node is one minus the sum 0.01×1 of the value of the links from the node of cluster 1 to an image node. In other words, the value is 1−0.01×2, which equals 0.98. Furthermore, the values of links from the background node to the dummy node, excluding the dummy node, are distributed evenly. The number of all nodes, excluding the dummy node, is 3 (number of image nodes)+2 (number of cluster nodes)+1 (number of background nodes), which equals 6. Therefore, the value of the link to each node is ⅙. This includes the value of the link from the background node to the background node.

Finally, no link is created to the dummy node or from the dummy node. For each block, the link structure is thus established for the image nodes, the cluster nodes, the background node, and the dummy node.

Figure 9B:
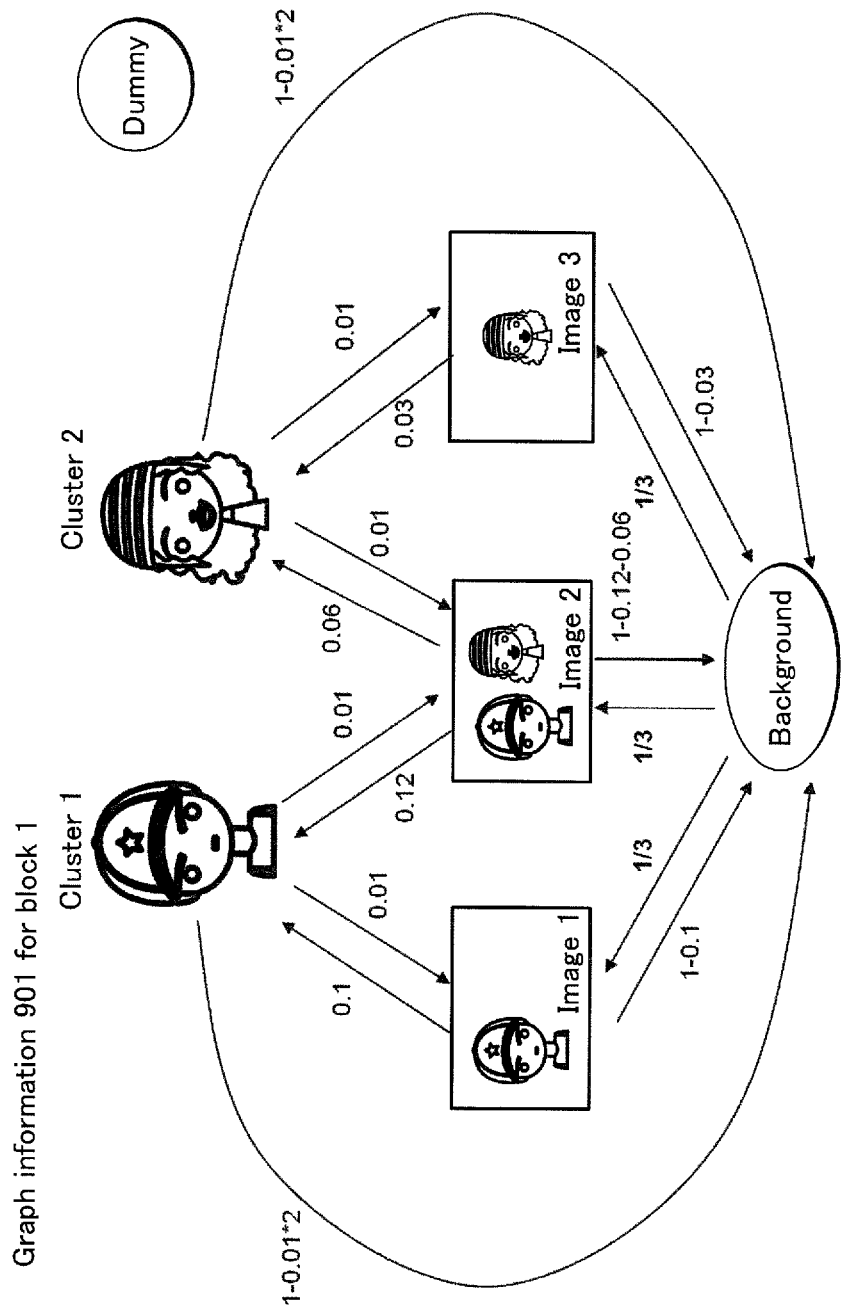
FIG. 9B illustrates an example of graph information 901 for block 1.

Note that instead of having links from the background node to all of the nodes (image nodes, person nodes, and background node) other than the dummy node as in FIG. 9A, the links from the background node in the graph information 900 may alternatively be only to images. FIG. 9B shows an example of graph information 901 with this structure. In the example in FIG. 9B, unlike FIG. 9A, no link is established from the background node to the person nodes or from the background node to the background node itself; links are only established from the background node to the image nodes. The links to the image nodes are weighted by even distribution among the image nodes. Specifically, since the number of image nodes is three, the weight of each link is ⅓.

In the subsequent description, the graph information 900 in FIG. 9A is used as an example of graph information, but the graph information 901 in FIG. 9B may be used instead.

Next, the graph generation unit 106 checks whether the graph structure has been generated for all of the blocks (S804). If the graph structure has been generated for all of the blocks, processing terminates. Otherwise, the graph structure for one of the remaining blocks is generated.

Figure 10:
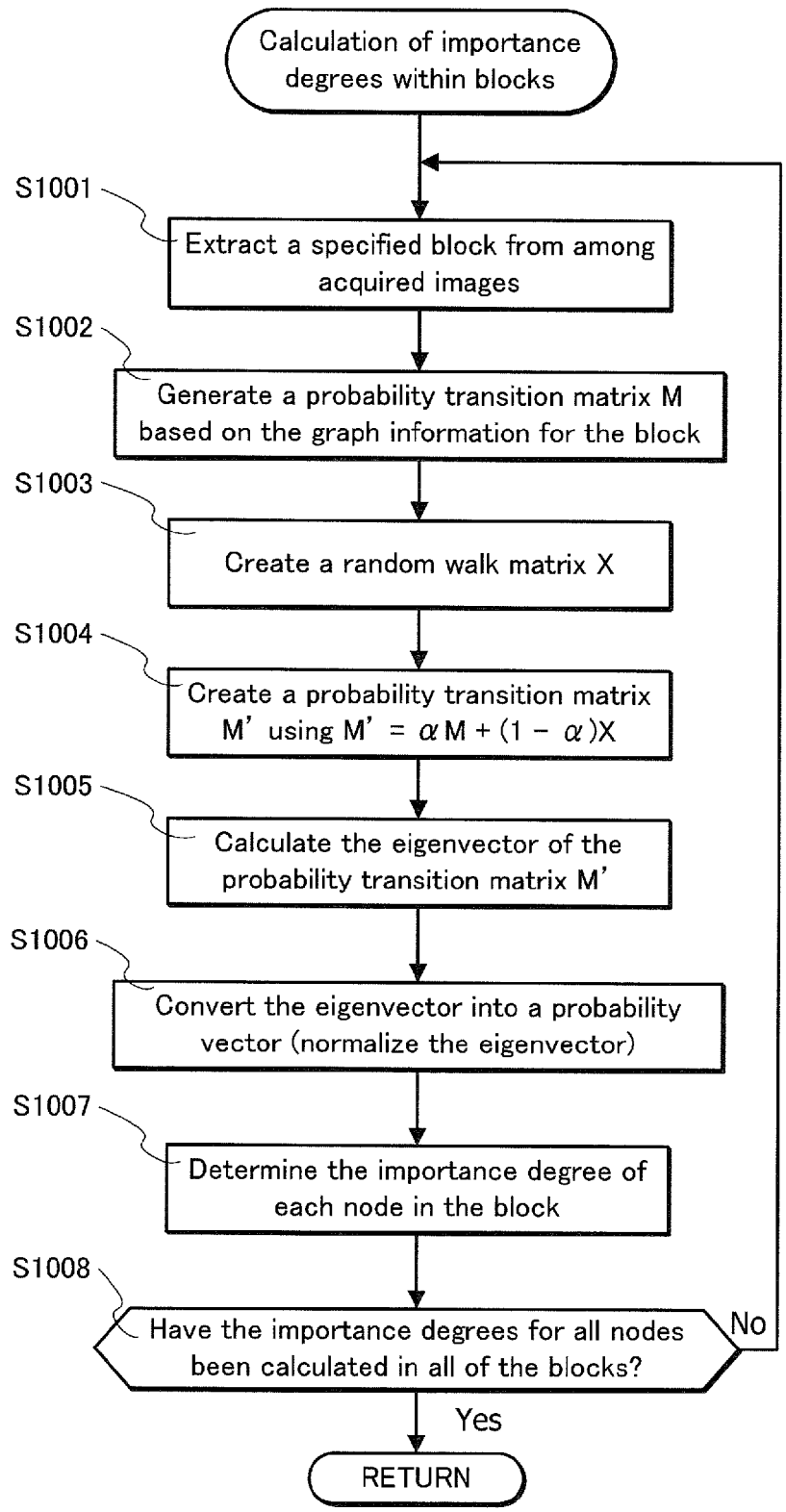
FIG. 10 is a flowchart illustrating details on processing for calculation of importance degrees in blocks.

FIG. 10 shows details on the calculation of the importance degree of each image and each cluster in a block.

An overview of the processing in FIG. 10 is as follows. Based on the link information generated by the graph generation unit 106, a probability transition matrix is generated. This probability transition matrix indicates the link relationship between nodes and the value of each link. Calculating the eigenvector of the probability transition matrix allows for calculation of the importance degree of each image and each cluster in a block. The importance degree of each node fluctuates depending on the link relationship between nodes but eventually converges on a constant value. The eigenvector indicates the value after propagation of the importance degree of each node converges.

Details on FIG. 10 are now described. First, the probability transition matrix generation unit 115 in the assessment unit 114 extracts a specified block from among acquired images (S1001). In the example above, the probability transition matrix generation unit 115 extracts block 1. The probability transition matrix generation unit 115 then generates a probability transition matrix M based on the graph information 900 for the extracted block 1 (S1002).

The method of calculating the probability transition matrix is to set the value of each link between nodes to be an element in the matrix. For example, when generating the probability transition matrix M for block 1, the graph information 900 generated in FIG. 9A is used.

FIG. 11 shows a probability transition matrix M 1100 calculated based on the graph information 900. All of the nodes are allocated to the rows and columns of the matrix. In this example, the matrix is organized in the following order: image nodes, cluster nodes, dummy node, and background node. The values of the links between nodes are assigned to the elements of the matrix. For example, the value of the link from the node for image 1 to the node for cluster 1 is 0.1. Accordingly, the element in row 4, column 1 is 0.1. The value of the link from the node for image 1 to the background node is 0.9. Accordingly, the element in row 7, column 1 is 0.9. Since no links exist from image 1 to images 1, 2 or 3, to cluster 2, or to the dummy node, the corresponding elements are all zero. The probability transition matrix M 1100 is generated by assigning all of the elements in the matrix in this way.

Next, the probability transition matrix generation unit 115 creates a random walk matrix X (S1003). This matrix X represents transitioning with an even probability from one node to any other node.

In the present method, the eigenvector of the probability transition matrix is sought in order to calculate the importance degree of images and clusters. The dummy node, however, is not linked to images or to clusters. Since the score of the dummy node does not propagate, its value cannot be sought. The random walk matrix is thus used to seek the score of the dummy node.

The elements of the random walk matrix X are an even distribution of the value of links for all nodes. For example, FIG. 12 illustrates a random walk matrix X 1200 for block 1. The organization of the rows and columns of this matrix is the same as in FIG. 11. The number of nodes in this case is seven, including the dummy node. Therefore, each element of the random walk matrix X 1200 is ⅐.

Next, the probability transition matrix generation unit 115 creates a probability transition matrix M' (S1004), specifically by substituting the probability transition matrix M 1100 and the random walk matrix X 1200 into the equation below.

$$M' = \alpha M + (1-\alpha)X \quad \text{Equation 1}$$

Here, α is a constant, such as 0.85.

Next, the intra-block importance degree calculation unit 116 calculates the eigenvector of the probability transition matrix M' (S1005). An example of the method for calculating the eigenvector of the matrix is a method using power iteration. While multiple eigenvectors may exist, the vector targeted for calculation here is limited to an eigenvector whose eigenvalue has an absolute value of one.

FIG. 13 illustrates an eigenvector 1300 sought from the probability transition matrix M'. It should be noted, however, that the values shown in FIG. 13 are not actual calculated values, but rather are tentative values for the purpose of illustration.

The intra-block importance degree calculation unit 116 then converts the eigenvector 1300 sought in step S1005 into a probability vector (S1006). Conversion into a probability vector is achieved by normalizing the elements so that their sum is one. Before conversion into a probability vector, the norm of the eigenvector is one. The importance degree, however, represents the probability existing at each node at a particular point in time. Accordingly, conversion of the eigenvector into a probability vector is necessary. Specifically, the elements are sought based on the following equation.

$$x'_i = x_i \times \sum_{j}^{n} x_j \quad \text{Equation 2}$$

The term $x_i$ on the right-hand side of the equation is the $i^{th}$ element of the eigenvector 1300. The term $x_i'$ on the left-hand side of the equation is the $i^{th}$ element of the eigenvector after conversion to a probability vector. For example, in the case of the eigenvector in FIG. 13, the first element of the eigenvector after conversion to a probability vector is 0.3×(0.3+0.4+0.1+0.22+0.15+0.01+0.8), which equals 0.152. Continuing in this manner yields an eigenvector 1400 after conversion to a probability vector, as illustrated in FIG. 14.

Next, the intra-block importance degree calculation unit 116 determines the importance degree of each node in the block (S1007). The elements of the eigenvector 1400, which has been converted into a probability vector, correspond to the nodes of the original probability transition matrix M 1100.

For example, the nodes in the first row of the probability transition matrix M 1100 are for image 1. In this case, the importance degree of image 1 in block 1 is 0.152, the value of the element in the first row of the eigenvector 1400, which has been converted into a probability vector.

FIG. 15 illustrates intra-block importance degree information 1500 for each node. The intra-block importance degree represents the local importance degree calculated within a block.

The intra-block importance degree information 1500 includes intra-block importance degrees 1501 through 1503 for respective blocks 1 through 3 and is stored in the intra-block importance degree information storage unit 111 of the storage unit 107.

Finally, the intra-block importance degree calculation unit 116 then determines whether the importance degrees have been calculated for all of the blocks that include the acquired images (S1008). If the importance degrees have been calculated for all of the blocks (S1008: Yes), then processing is complete.

If a block for which the importance degrees have not been calculated remains (S1008: No), then in step S1001 the probability transition matrix generation unit 115 extracts a block whose importance degrees have not been calculated and performs the same processing from step S1002 onwards.

Figure 16:
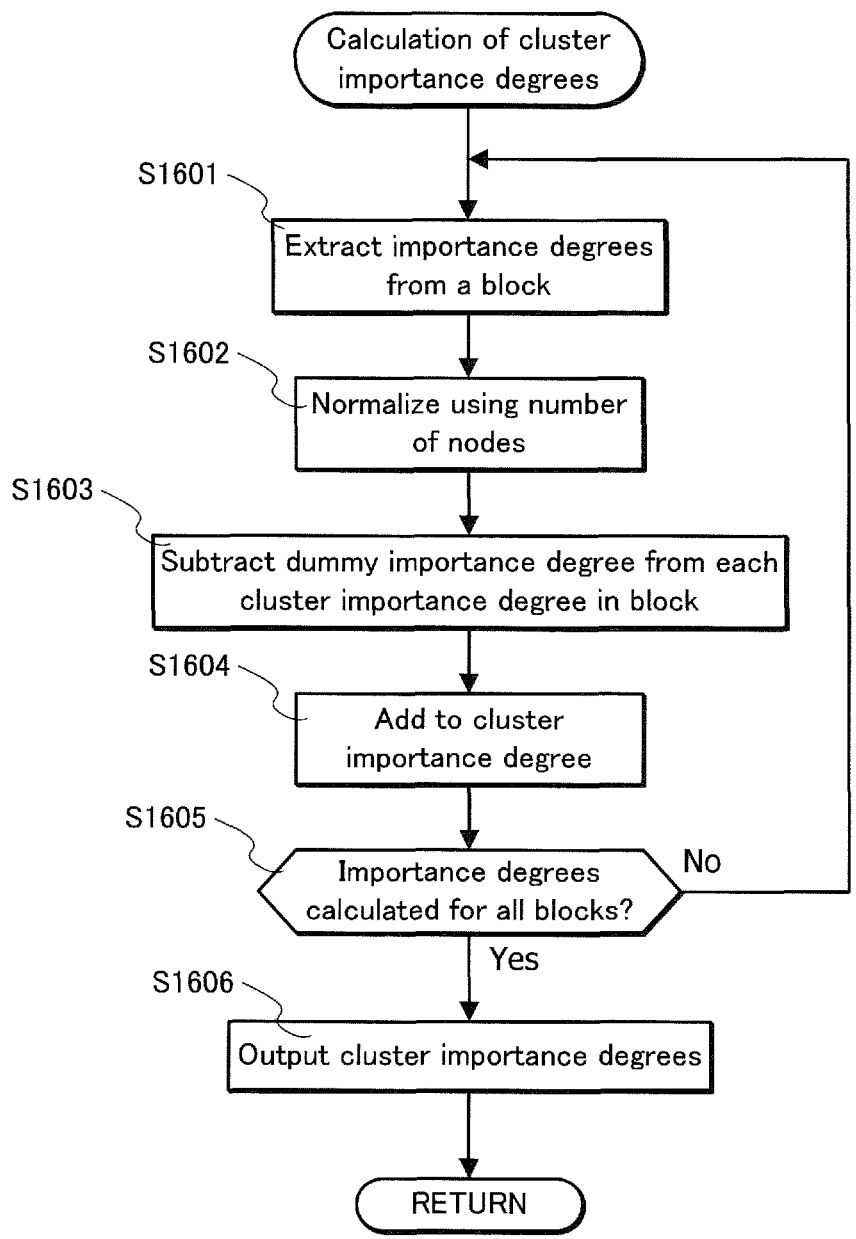
FIG. 16 is a flowchart illustrating details on processing for calculation of cluster importance degrees.

FIG. 16 is a flowchart showing details on the calculation of the cluster importance degrees in step S205 of FIG. 2.

The cluster importance degrees are indices for judging clusters. The importance degree of a cluster rises as an object in the cluster occupies a larger area in a greater number of images.

The cluster importance degrees are calculated based on the importance degree of each cluster calculated in each block. The cluster importance degree calculation unit 118 extracts the intra-block importance degrees 1500 for one block stored in the intra-block importance degree information storage unit (S1601).

Next, the importance degree normalization unit 117 normalizes the extracted intra-block importance degrees using the number of nodes included in the block (S1602). This processing is performed so that the intra-block importance degrees for nodes with the same link structure will represent the same importance degree in any block. Even though nodes have the same link structure, the importance degree grows smaller as the number of nodes included in a block increases, due to the effect of conversion to a probability vector in step S1006. This is because conversion into a probability vector causes the sum of the importance degree of each node in a block to equal one. This processing is performed to remove this effect. Specifically, each element of the intra-block importance degrees is multiplied by the total number of nodes in the block.

Figure 17:
FIG. 17 illustrates intra-block importance degree information 1501 that has been normalized using the number of nodes.

FIG. 17 illustrates an example of this calculation. The total number of nodes in block 1 is seven (images 1, 2, and 3, clusters 1 and 2, dummy, and background). Accordingly, the intra-block importance degree of each node in block 1 is multiplied by seven. For example, the value for image 1 when normalized by the number of nodes is 0.152×7, which equals 1.064. The importance degree normalization unit 117 normalizes the intra-block importance degrees similarly for other blocks as well.

Upon completing normalization by the number of nodes, the importance degree normalization unit 117 subtracts the intra-block importance degree of the dummy node from the intra-block importance degree of each cluster node (S1603). This is described with reference to FIG. 18.

Figure 18:
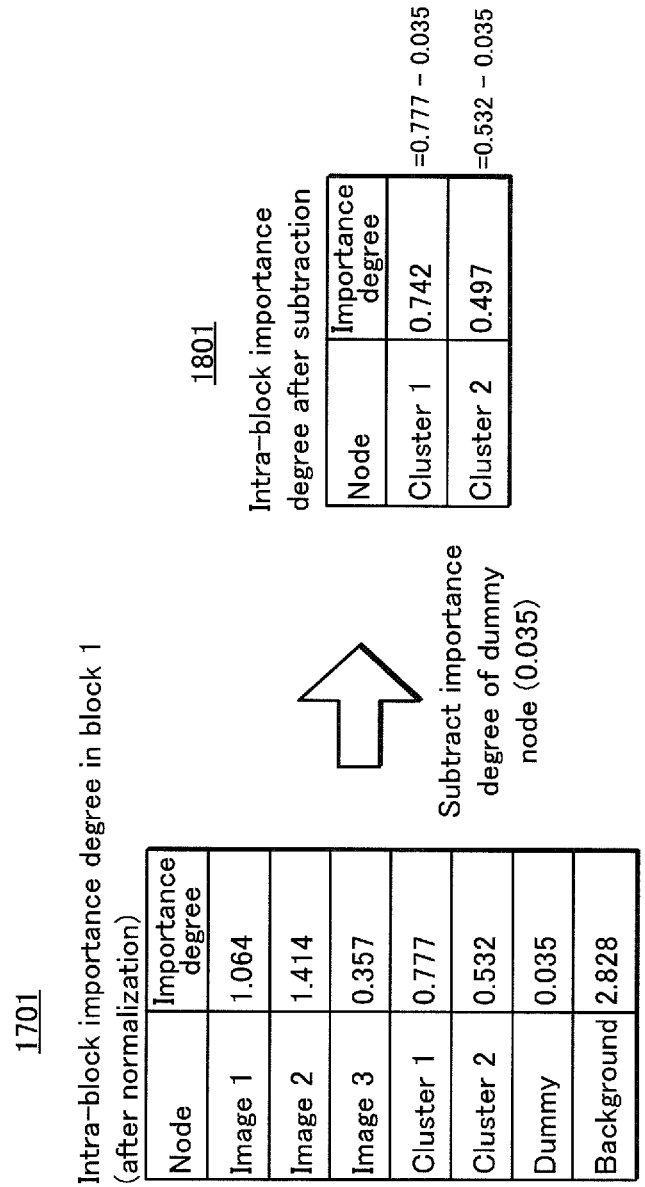
FIG. 18 illustrates the cluster importance degrees, in the intra-block importance degree information 1701, after subtraction of the importance degree of the dummy node.

As illustrated in FIG. 18, among the normalized intra-block importance degrees 1701, the intra-block importance degree of cluster 1 is 0.777. The intra-block importance degree of the dummy node is 0.035. Therefore, the value of the intra-block importance degree is set to 0.777−0.035, which equals 0.742. The intra-block importance degree of the dummy node is similarly subtracted from all of the cluster nodes to yield the intra-block importance degrees 1801.

Figure 19:
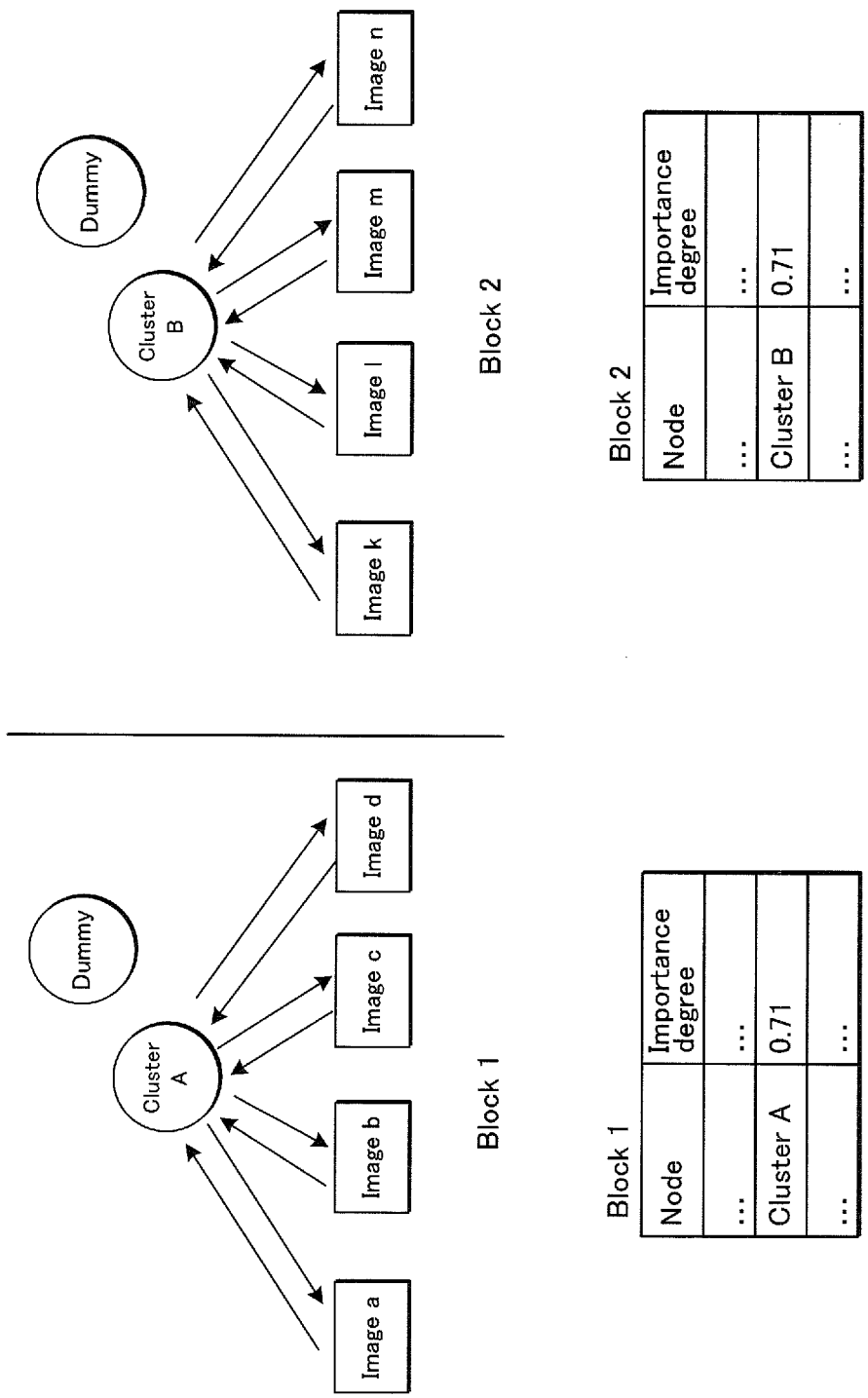
FIG. 19 illustrates link structures and the intra-block importance degree within blocks when the method of grouping into blocks is the same.
Figure 20:
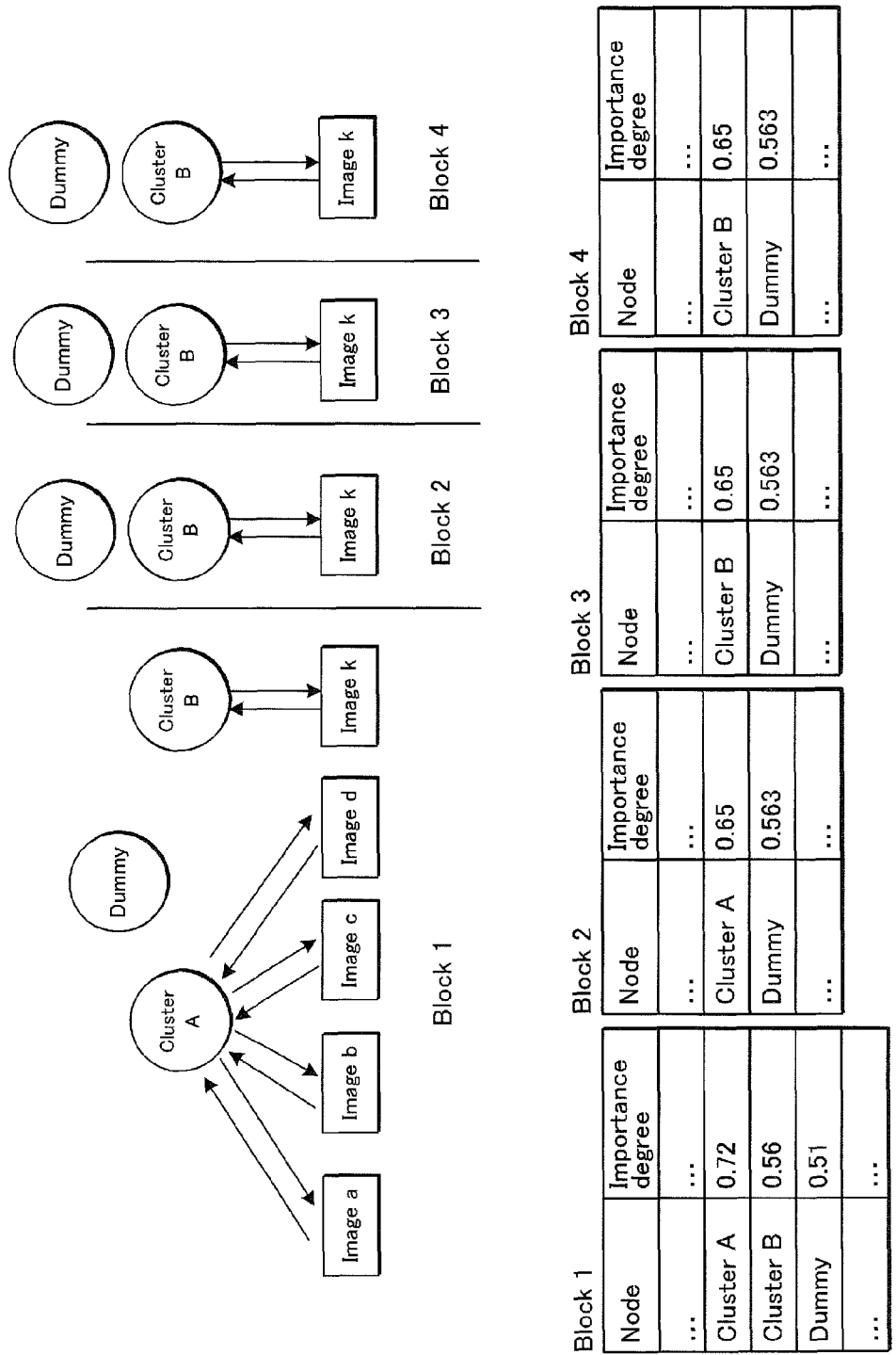
FIG. 20 illustrates link structures and the intra-block importance degrees within blocks when the method of grouping into blocks differs.

With reference to FIGS. 19 and 20, the following explains the reason why the processing in S1603 is necessary. For example, suppose that cluster A and cluster B have the same link structure, as shown in FIG. 19. The value of every link is assumed to be the same so as to simplify the explanation. At this point, the intra-block importance degree is 0.71 for both cluster A and cluster B. In other words, for each of two clusters, if the number of images that include an object categorized into the cluster and the occupation degree within the images are the same, then the importance degree of the two clusters is also the same. As shown in FIG. 20, however, the method of grouping into blocks may not be the same. Here, the score of the dummy node has not been calculated.

While described below in more detail, the method of calculating the importance degree of a cluster is to sum the intra-block importance degrees included in each block. For example, since cluster A is only included in block 1, the cluster importance degree of cluster A is the intra-block importance degree in block 1, i.e. 0.72. Since cluster B is included in blocks 1, 2, 3, and 4, the cluster importance degree of cluster B is the sum of the respective intra-block importance degrees. In other words, the cluster importance degree is 0.56+0.65×3=2.51. As this result shows, the cluster importance degrees of clusters A and B differ due to the different methods for grouping into blocks. The reason for this difference is the importance degree that ends up being assigned to nodes independent of the link structure.

In other words, the importance degree 0.65 of cluster B in each of blocks 2 through 4 can be considered to be a value with a fixed importance degree added thereon.

The importance degree of the dummy node can be considered to represent this fixed importance degree.

Accordingly, the importance degree of the dummy node, which has no links to or from other nodes, is calculated, and the result is subtracted from the intra-block importance degree of each node. This allows for the cluster importance degree to remain the same for the same link structure regardless of how images are grouped into blocks.

For example, in the case of FIG. 20, the cluster importance degree of cluster A is 0.72−0.51, which equals 0.21. The cluster importance degree of cluster B is (0.56−0.51)+(0.65−0.563)×3, which equals 0.21.

The value calculated by the intra-block importance degree calculation unit 116 in step S1603 is the intra-block importance degree for the cluster. To the cluster importance degree stored in association with each cluster, the cluster importance degree calculation unit 118 then adds the calculated intra-block importance degree for the cluster (S1604).

Finally, the assessment unit 115 checks whether the calculation of the importance degrees is complete for all of the blocks (S1605).

If the importance degrees have been calculated for all of the blocks (S1605: Yes), the cluster importance degree stored in association with each cluster is output and stored in the cluster importance degree information storage unit 113 (S1606).

Conversely, when a block for which the importance degree has not been calculated remains (S1605: No), the same processing from step S1601 onwards is performed for that block. FIG. 21 illustrates cluster importance degree information 2100 calculated in this way.

By repeating step S1604 for each block, the importance degree of a cluster becomes the sum of the intra-block importance degree in each block.

This example is described with reference to FIG. 28. Supposing the intra-block importance degree of cluster 1 in blocks 1 through 3 is respectively 0.742, 0, and 0, then the importance degree of cluster 1 for all of the acquired images is 0.742+0+0, which equals 0.742.

Note that the cluster importance degree information 2100 in FIG. 21 is stored in the cluster importance degree information storage unit 113 of the storage unit 107.

Figure 22:
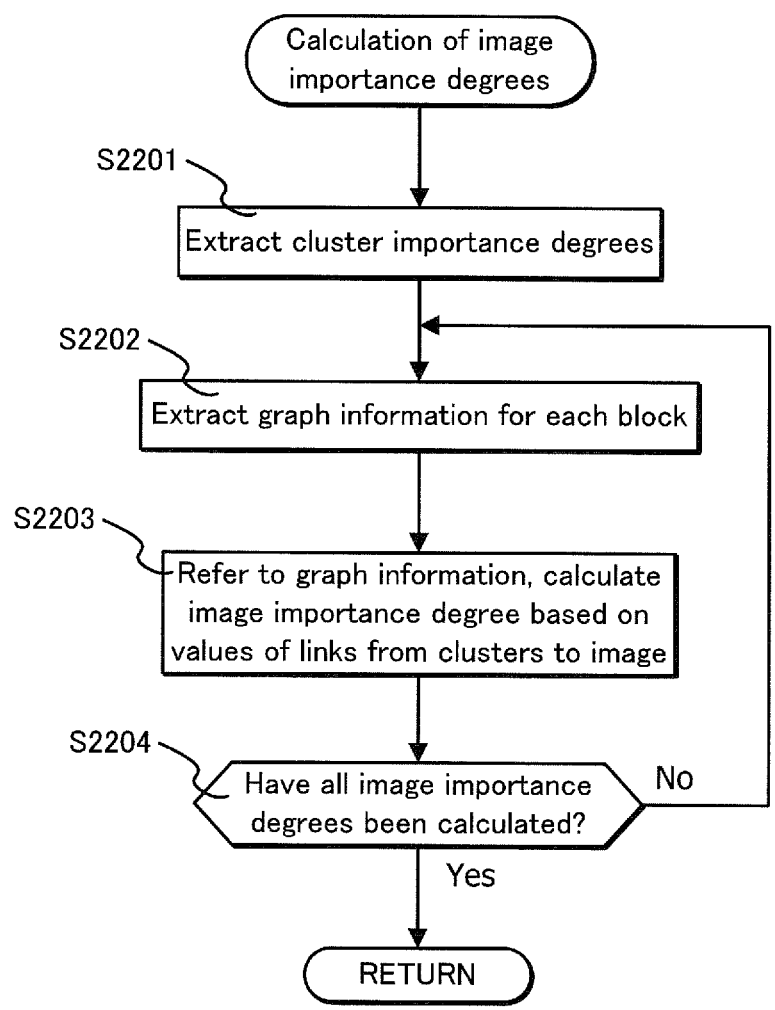
FIG. 22 is a flowchart illustrating details on processing for calculation of image importance degrees.

FIG. 22 is a flowchart showing details on the calculation of the image importance degree in step S206 of FIG. 2. The image importance degree is an index for judging an image. The image importance degree is calculated to be high when the image includes a large number of clusters with a high importance degree. The image importance degree is calculated based on the cluster importance degree information 2100 and the graph information. The image importance degree calculation unit 119 extracts the cluster importance degree information 2100 from the cluster importance degree information storage unit (S2201).

The image importance degree calculation unit 119 then extracts the graph information for each block (S2202).

Next, the image importance degree calculation unit 119 calculates the image importance degrees based on the values, in the graph information, of the links from clusters to images (S2203).

Specifically, the image importance degree is the product of the cluster importance degree and the value of the link from the cluster to the image. When an image is linked to from a plurality of clusters, the values are summed.

The following describes an example using the graph information for block 1 in FIG. 9A and the cluster importance degree information 2100 in FIG. 21. Cluster 1 includes images 1 through 3. Accordingly, the image importance degrees for images 1 through 33 are calculated from the graph information in block 1.

Specifically, the image importance degree of image 1 is the product of the cluster importance degree for cluster 1 of 0.772 and the value of the link from cluster 1 to image 1, 0.01, i.e. 0.772×0.01, which equals 0.00772 (see FIG. 29(a)).

Similarly, the importance degree of image 2 is based on the cluster importance degrees for cluster 1 and cluster 2 and is evaluated as 0.772×0.01+0.527×0.01, which equals 0.01299 (see FIG. 29(b)).

Next, the image importance degree calculation unit 119 checks whether the image importance degree has been calculated for all blocks (S2204). If the importance degree has been calculated for all of the blocks (S2204: Yes), then processing is complete. If an image for which the importance degree has not been calculated remains (S2204: No), then the same processing is repeated, with the image for which the importance degree has not yet been calculated as the target of processing in step S2202.

FIG. 23 illustrates image importance degree information 2300 calculated in this way. These values are calculated based on the graph information for all of the blocks. The image importance degree information 2300 is stored in the image importance degree information storage unit 112 of the storage unit 107.

FIG. 24 illustrates the result of ranking images in order of image importance degree in step S207. This informs the user of the rank of images. These results are output to the display device 140 via the display control unit 120.

As described above, the image management device 100 of Embodiment 1 graphs the relationship between acquired images and clusters generated from objects included in the images in order to calculate image importance degrees. Furthermore, in order to reduce the size of the matrix necessary for calculation, the image management device 100 calculates the importance degree for acquired images for each of a plurality of blocks.

This reduces the processing load for calculating the image importance degrees.

In the example in FIG. 4, eight images include an object, and six types of clusters exist. Therefore, it is necessary to calculate a 26 by 26 probability transition matrix, since including the dummy node and the background node, 18+6+1+1 equals 26. By contrast, if the eight images are divided into blocks 1 through 3, block 1 has a 7 by 7 probability transition matrix M 1100 (see FIG. 11), and blocks 2 and 3 also have a probability transition matrix with an equivalent number of rows and columns. In this way, a probability transition matrix with fewer rows and columns can be made the target of calculation, and in particular, the processing load for calculating the eigenvector can be greatly reduced.

Suppose that an enormous number of images are present, such as a 1,000,000, and that 100 types of clusters are included in the images.

In this case, the probability transition matrix is at least $(1{,}000{,}000+1{,}000) \times (1{,}000{,}000+1{,}000)$. Supposing that four bytes are necessary to store each element of the matrix, approximately $4 \times 10^{12}$ bytes (approximately 4 TB) would be necessary, which is a vast amount of memory.

If the number of images in a block is set to 10,000, however, a probability transition matrix that is approximately $(10{,}000+1{,}000) \times (10{,}000+1{,}000)$ suffices, so that image importance degrees can be calculated even in an environment with limited memory.

Embodiment 2

In Embodiment 2, a method is described for generating blocks that include not only acquired images, but also previously stored images. Note that the only difference from the flowchart of FIG. 2, which is the processing flow for Embodiment 1, is the portion for assigning block IDs in step S202. Other portions do not differ from Embodiment 1, and therefore an explanation thereof is omitted.

Figure 25:
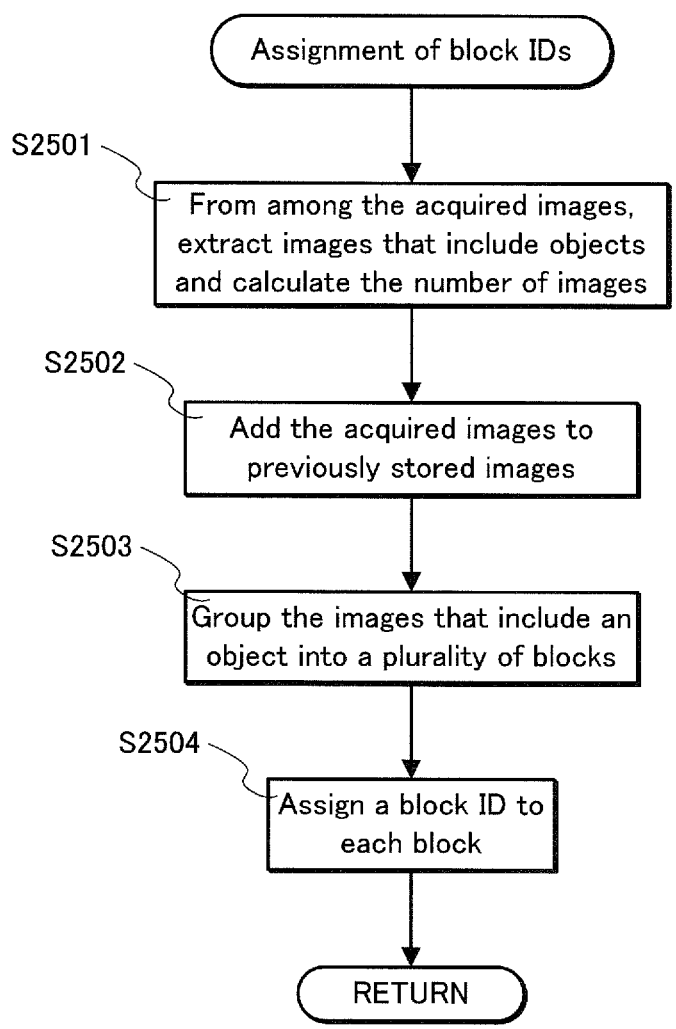
FIG. 25 is a flowchart illustrating processing to assign block IDs in Embodiment 2.

FIG. 25 shows details on block ID assignment in step S202 of FIG. 2. Here, images that have previously been stored are added to newly acquired images when grouping images into blocks. Doing so reduces the memory needed for calculating the importance degrees of objects during subsequent processing.

First, from among the acquired images, the block generation unit 105 extracts images that include objects based on the object information 500 and calculates the number of extracted images (S2501). Next, the block generation unit 105 adds the acquired images to previously stored images (S2502).

The block generation unit 105 then groups the images that include an object into a plurality of blocks (S2503). As this point, previously stored images that have already been assigned a block ID are once again grouped into blocks. Subsequent processing is similar to steps S602 and S603 in Embodiment 1, and therefore a description thereof is omitted.

The following three methods of grouping into blocks in step S2503 are possible.

(Grouping method 1) All of the previously stored images and the acquired images are grouped into blocks.

For example, suppose that images 1 through 8 were previously stored and grouped into the following blocks: block 1 (images 1 through 3), block 2 (images 4 through 6), and block 3 (images 7 and 8). If images 9 through 16 are newly acquired, block grouping is performed anew on all of the images, i.e. images 1 through 16.

(Grouping method 2) Only newly acquired images are grouped into blocks, with no previously stored images whatsoever being grouped into blocks.

Figure 30:
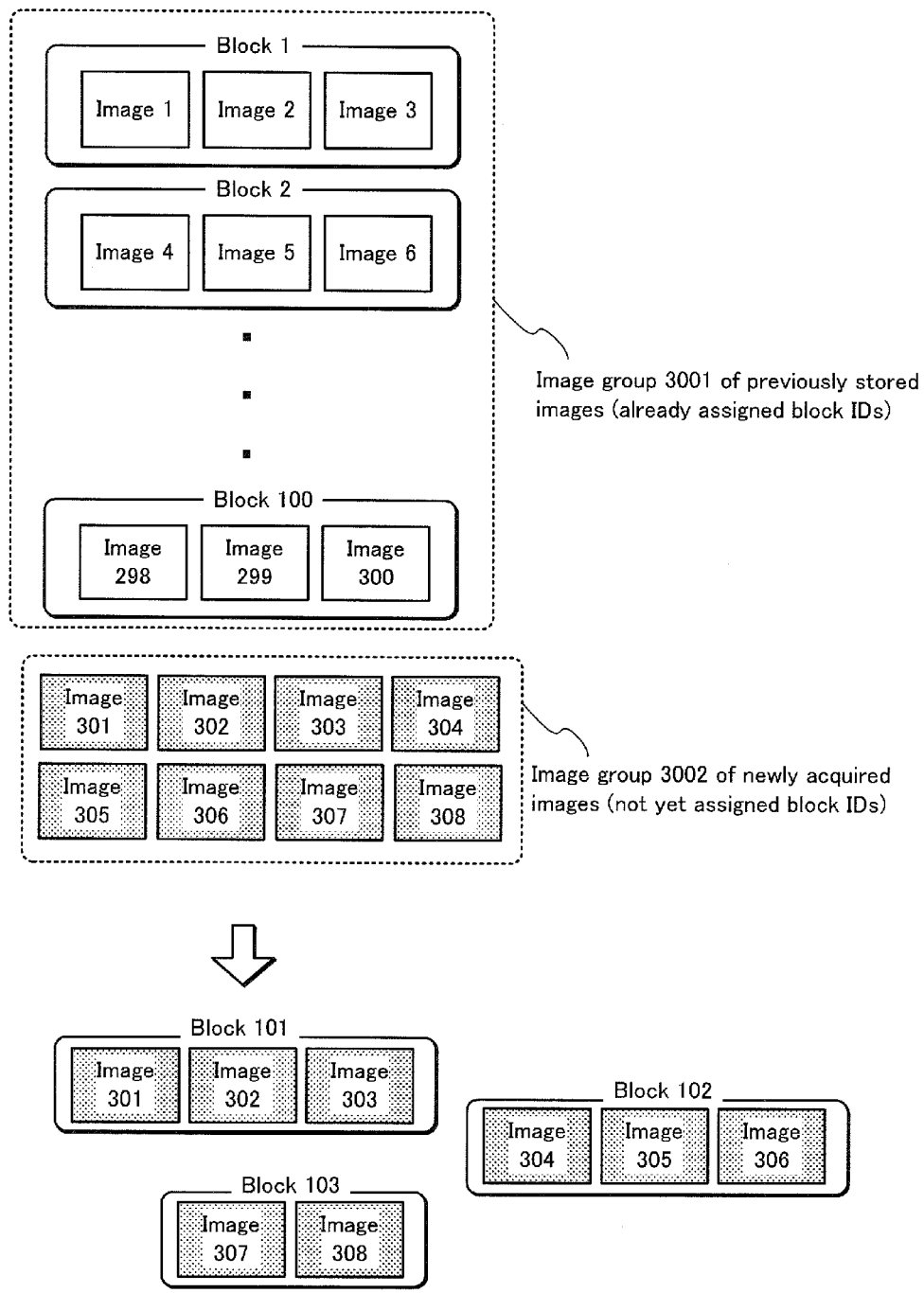
FIG. 30 illustrates a method for creating new blocks from newly acquired images.

For example, suppose that images 1 through 300 were previously stored and divided into blocks, as illustrated in FIG. 30. In this case, if images 301 through 308 are newly acquired, only images 301 through 308 are grouped into blocks.

(Grouping method 3) This grouping method combines the advantages of grouping methods 1 and 2.

Figure 31:
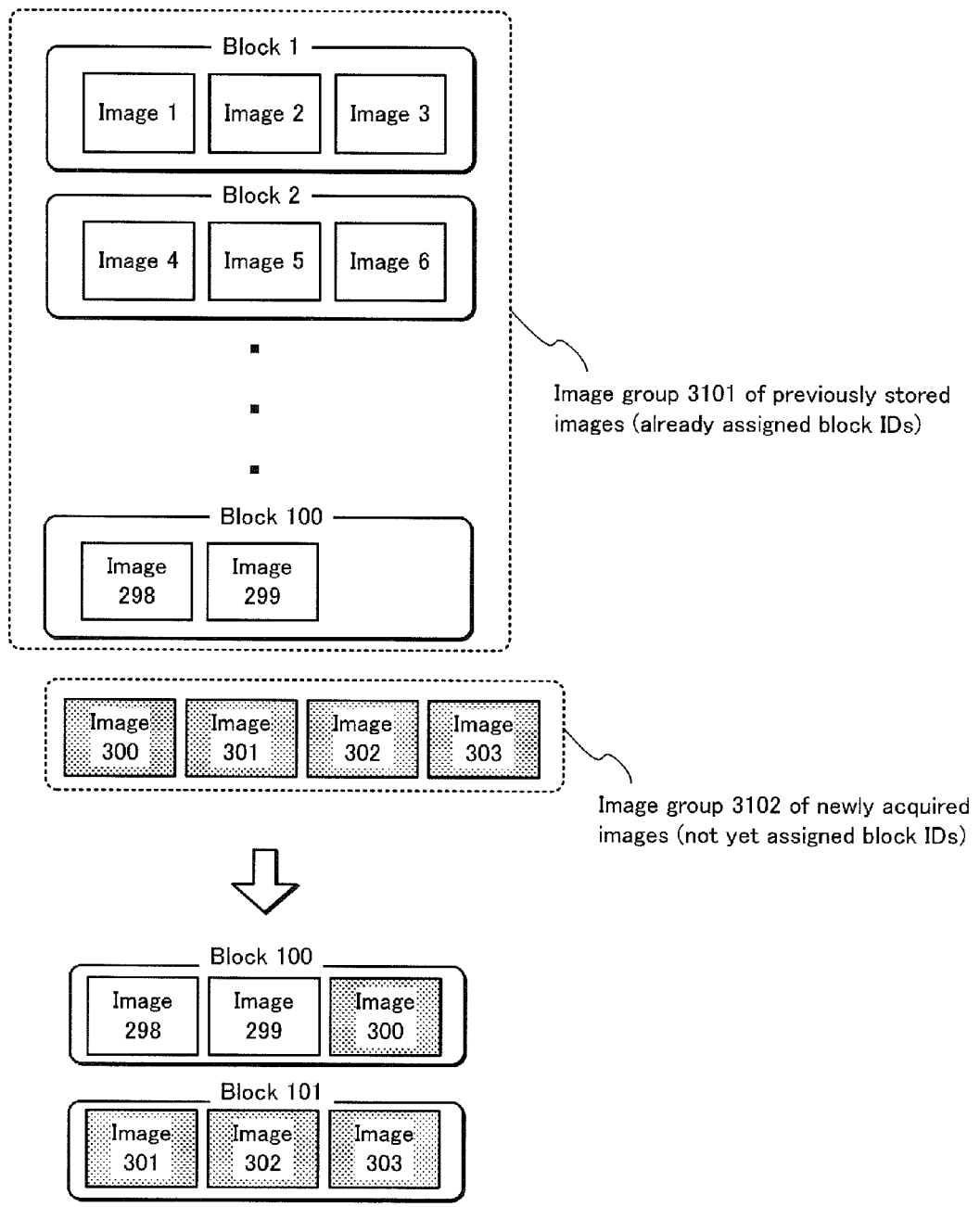
FIG. 31 illustrates a method for creating new blocks from a combination of newly acquired images and previously acquired images.

For example, suppose that images 1 through 299 were previously stored and divided into blocks, as illustrated in FIG. 31. In this case, if images 300 through 303 are newly acquired, images 298 and 299 in block 100, which is under the limit of three images per block, and images 300 through 303 are targeted for grouping into blocks.

Among the grouping methods 1 through 3, no single method is the best, as each has advantages and disadvantages. The appropriate grouping method for the circumstances may be chosen.

For example, grouping method 1 increases the amount of matrix calculation for the blocks, since images are grouped into blocks again. Nevertheless, this method has the advantage of allowing for flexible optimization of grouping into blocks depending on factors such as the number of newly acquired images and whether images include objects.

Specifically, grouping method 1 is useful when the number of newly acquired images is greater than the number of previously stored images, and when the size of a block needs to be increased (for example, when switching from ten images per block to 100 images per block).

On the other hand, with grouping method 2, the cluster importance degrees and the image importance degrees in each block for blocks 1 through 100 of previously stored images do not change, as shown in FIG. 30. Therefore, matrix calculation does not need to be performed. It thus suffices to perform matrix calculation only on the new blocks 101 through 103, thereby contributing to a reduction in the calculation load.

Embodiment 3

The method described in Embodiment 3 uses the importance degree of the dummy node, instead of the number of nodes, in order to normalize the intra-block importance degrees in each block during the calculation of cluster importance degree in Embodiment 1.

Figure 26:
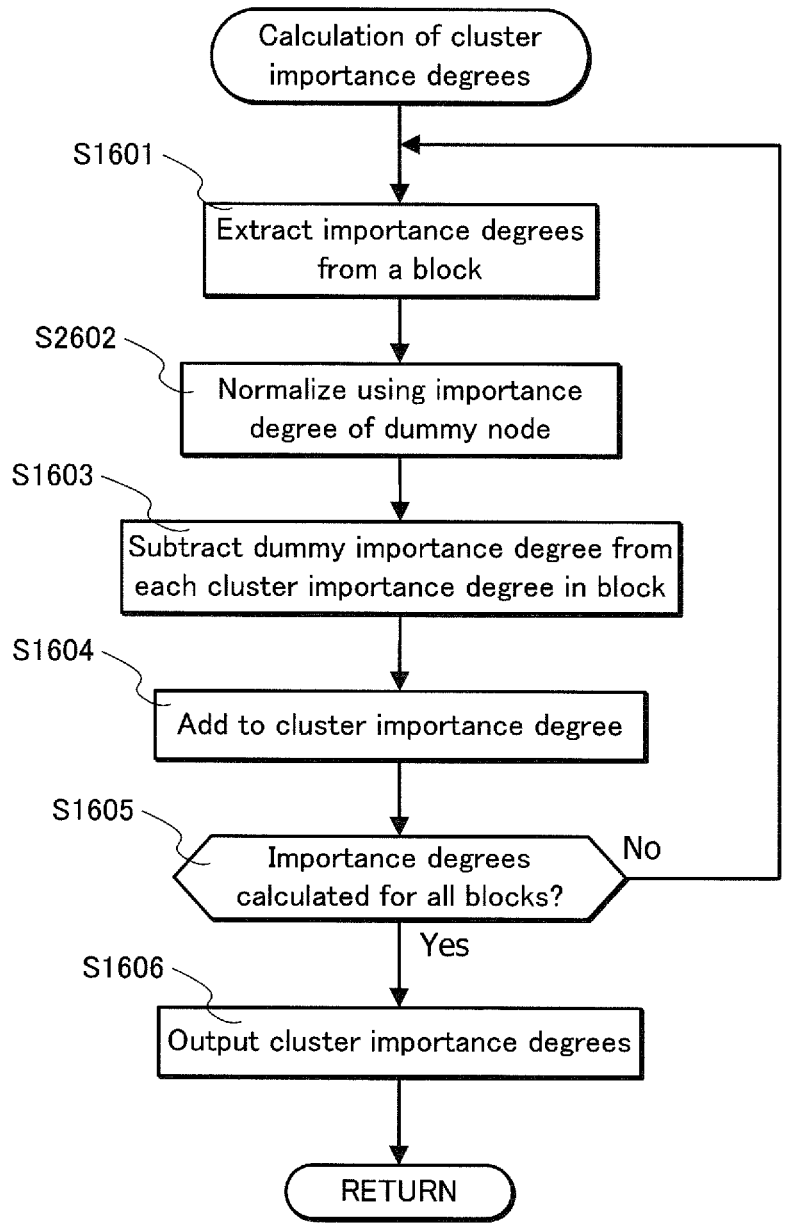
FIG. 26 is a flowchart illustrating processing for calculation of cluster importance degrees in Embodiment 3.

FIG. 26 shows details on the calculation of the cluster importance degrees in step S205 of FIG. 2. Note that the only difference from the flowchart of FIG. 16, which is the processing flow for Embodiment 1, is the portion for normalizing with the number of nodes in step S1602. Other portions do not differ from Embodiment 1, and therefore an explanation thereof is omitted.

Figure 27:
FIG. 27 is an example of intra-block importance degrees after normalization using the dummy node importance degree.

The cluster importance degree calculation unit 118 normalizes the intra-block importance degrees in each block using the importance degree of the dummy node (S2602). Specifically, the cluster importance degree calculation unit 118 multiplies all of the importance degrees by a factor that yields a score of 1 for the dummy node in the intra-block importance degrees. FIG. 27 illustrates an example. Suppose that the intra-block importance degrees in block 1 are as shown in FIG. 27. The importance degree of the dummy node in this case is 0.005. The factor yielding a value of one for the dummy node is 1/0.005, which equals 200. Therefore, the intra-block importance degree of every node is multiplied by 200. Since the intra-block importance degree of image 1 is 0.152, the normalized value becomes 0.152×200, which equals 30.4. The intra-block importance degree of every other node is similarly normalized.

As described above, the image management device 100 of Embodiment 3 allows for calculation of the image importance degrees using a different method for normalization than Embodiment 1.

Embodiment 4

When calculating the importance degree of a particular cluster, Embodiment 4 aims for a more reasonable calculation of the importance degree by accumulating not only the intra-block importance degrees, but also an importance degree that corresponds to the cluster and has already been calculated by an external device. Hereinafter, the cluster importance degree calculated by the external device is referred to as an "external importance degree".

Figure 34:
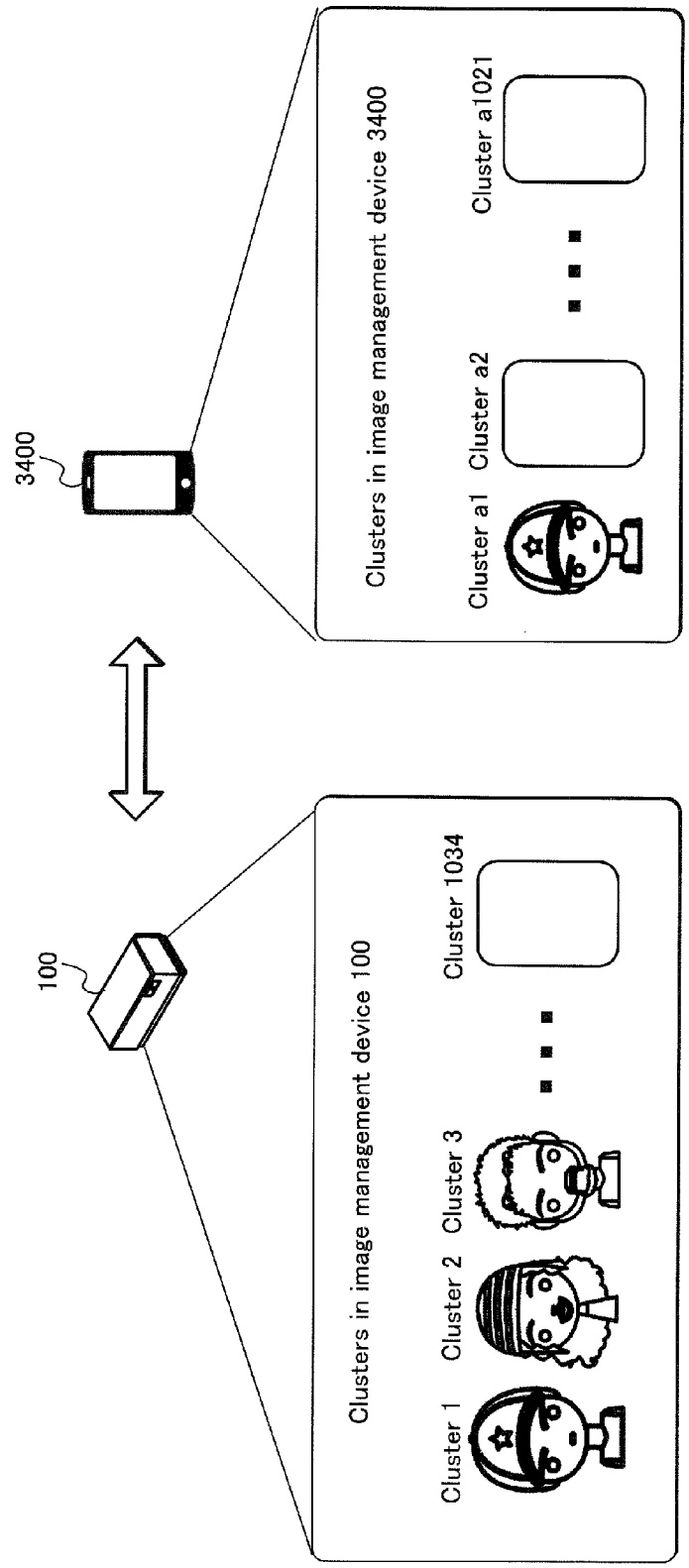
FIG. 34 provides a general idea of processing in Embodiment 4.

An image management device 3400 shown in FIG. 34 has the same functions as the image management device 100. In other words, the image management device 3400 has a function to extract faces from images, like the object feature value extraction unit 103; a function to perform clustering based on the extracted faces, like the clustering unit 104; and a function to calculate the importance degree for each cluster, like the cluster importance degree calculation unit 118.

The image management device 100 and the image management device 3400 can exchange various types of data over a line (either wired or wireless).

The processing flow in the present embodiment is now described with reference to FIGS. 35 and 36.

First, the clustering unit 104 of the image management device 100 acquires feature values from the image management device 3400 (S3501).

Next, the clustering unit 104 compares the feature values of each categorized cluster with the acquired feature values (S3502). In the example in FIG. 35, the clustering unit 104 acquires the feature values for cluster a1 and compares the acquired feature values with the feature values of each of clusters 1 through 3.

The clustering unit 104 then identifies which of the categorized clusters the acquire feature values correspond to (S3503). The method of identification may, for example, be to identify the feature values with the highest degree of similarity, or to base identification on whether the degree of similarity of the feature values exceeds a threshold.

Next, based on the comparison of feature values, the clustering unit 104 creates a correspondence table indicating the correspondence to the identified cluster ID.

For example, in the correspondence table shown in FIG. 35, cluster 1 in the image management device 100 corresponds to cluster a1 in the image management device 3400.

This sort of correspondence table allows the image management device 100 and the image management device 3400 to share cluster IDs.

After thus sharing cluster IDs, when cluster importance degrees are to be calculated in the image management device 100, the cluster importance degree calculation unit 118 acquires the external importance degree of the cluster with the corresponding ID from the image management device 3400 (S3505).

For example, when the importance degree of cluster 1 is to be calculated in the image management device 100, the cluster importance degree calculation unit 118 refers to the above correspondence table and acquires the external importance degree for cluster a1, which corresponds to cluster 1, from the image management device 3400.

Figure 36:
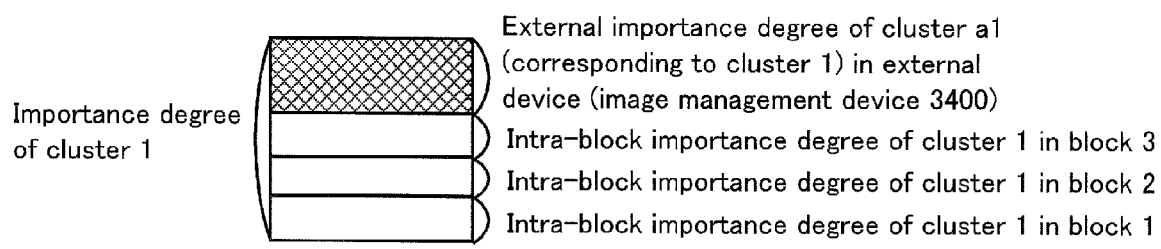
FIG. 36 provides a general idea of processing.

As shown in FIG. 36, when calculating the importance degree of cluster 1, the cluster importance degree calculation unit 118 then accumulates not only the intra-block importance degree of cluster 1 in each of blocks 1 through 3, but also the acquired external importance degree of cluster a1 (which corresponds to cluster 1) within the external device (image management device 3400).

Note that as in the image management device 100, images may be grouped into a plurality of blocks in the image management device 3400, and the cluster importance degree may be calculated by summing each intra-block importance degree.

Furthermore, in addition to the image management devices 100 and 3400, connection may be made to a cloud-based server, and the server may be assigned a portion of the processing.

While in the present embodiment, the image management device 100 creates a correspondence table of IDs, alternatively the ID in the image management device 3400 may be rewritten to match the ID in the image management device 100 (for example, cluster a1 may be rewritten as cluster 1).

Furthermore, in cases such as when the algorithm for facial recognition differs greatly between the image management device 100 and the image management device 3400, the method to compare feature values may be difficult to use. In such a case, the images belonging to a cluster may be acquired instead of the feature values.

Embodiment 5

In the above embodiments, examples have been described of grouping images into blocks. Grouping images into small-size blocks, however, increases the risk of limiting propagation of importance degree. Therefore, it is desirable to use as large a block size as possible.

If the block size is too large, however, the resource load for matrix calculation grows exceedingly large.

To address this problem, Embodiment 5 sets the size of blocks in accordance with device resources.

One example of resources is memory size. In other words, Embodiment 5 changes the number of images included in blocks generated by the block generation unit 105 in accordance with the memory size available for calculation of the importance degrees.

For example, if the memory size available for calculation of the importance degrees is 2 MB, the number of images per block may be set to 10,000, whereas if the memory size available for calculation of the importance degrees is 1 MB, the number of images per block may be set to 5,000. The range (lower limit and upper limit) of the number of images per block may be set in other ways in accordance with the memory size.

Apart from memory size, other examples of resources include the CPU clock frequency and the CPU usage. When the storage unit 107 is a HDD, the resources may also be the number of revolutions per minute, the cache size, or the like.

Furthermore, based on the above-listed items (memory size, CPU clock frequency, CPU usage, number of revolutions of HDD, cache size of HDD), a value acting as an index of the importance degree calculation processing capability may be calculated, and the number of images in each block may be set based on this value.

Supplementary Explanation

Although embodiments of the present invention have been described above, it is to be understood that the present invention is not limited thereto. The present invention is applicable in various embodiments and modifications which are for achieving the aim of the present invention or other aims related or associated thereto. For example, the following modifications are possible.

Figure 28:
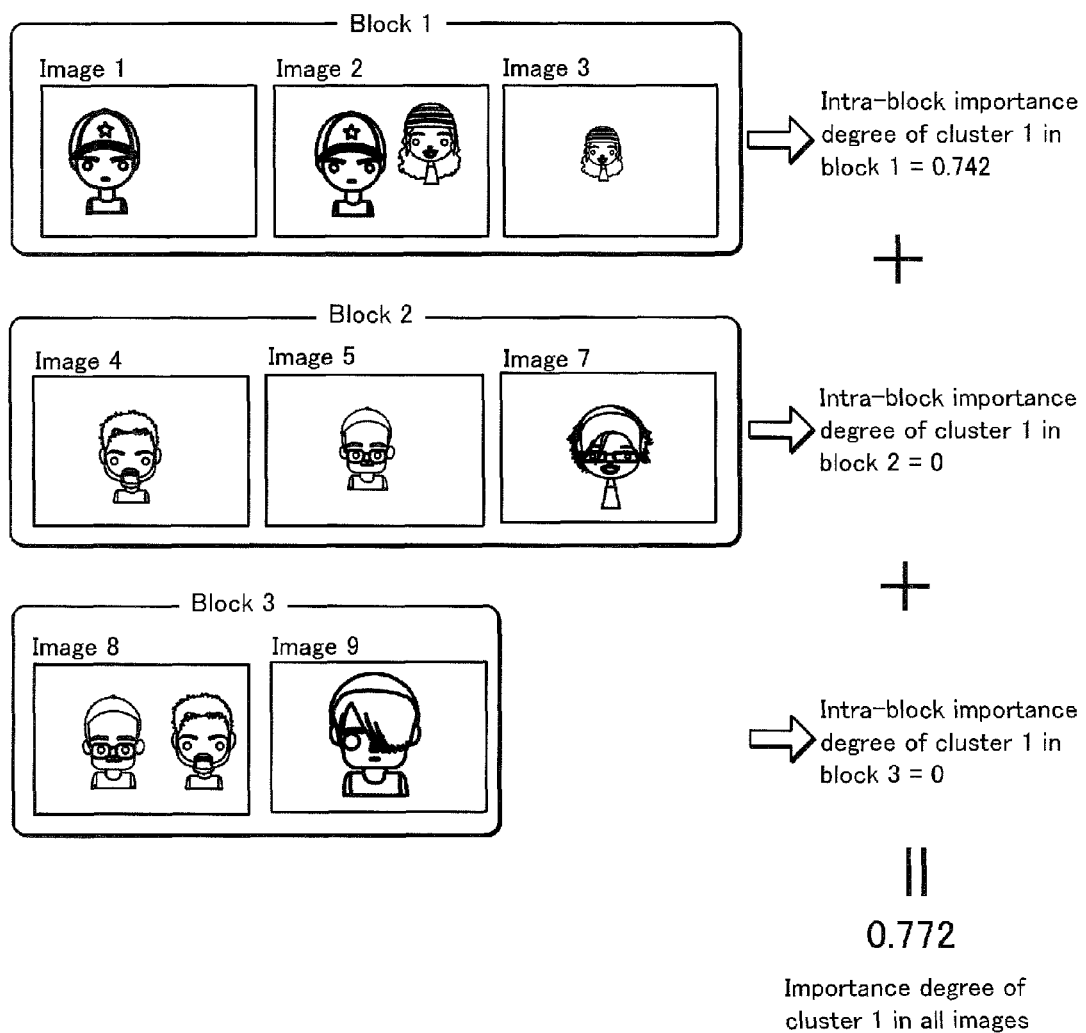
FIG. 28 illustrates a method for calculating the importance degree of cluster 1 in all images by adding the intra-block importance degree of cluster 1 in blocks 1 through 3.

(1) With regards to the method of calculating the cluster importance degree from the intra-block importance degrees of a cluster, the following is a supplementary explanation of the method of calculating the importance degree that was described briefly with reference to FIG. 28.

When a particular cluster is included in a plurality of blocks, a plurality of intra-block importance degrees are calculated. In this case, the final cluster importance degree can be calculated by accumulating the plurality of block importance degrees.

Figure 32:
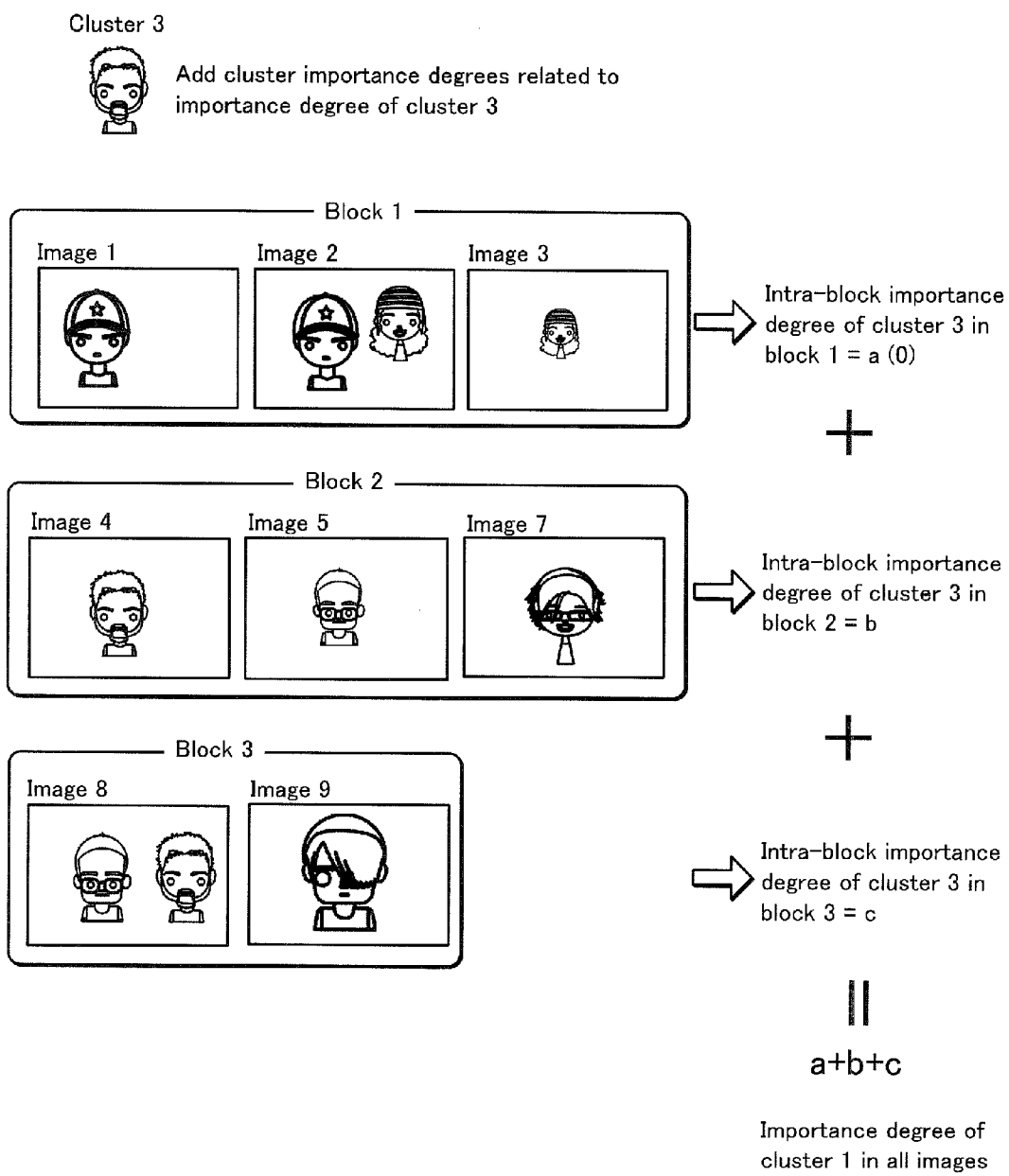
FIG. 32 illustrates a method for calculating the importance degree of cluster 1 in all images by adding the intra-block importance degree of cluster 1 in blocks 1 through 3.

For example, as shown in FIG. 32, the final cluster importance degree of cluster 3, which is included in both block 2 and block 3, can be calculated as a+b+c, which is the sum of the intra-block importance degrees a, b, and c for cluster 3 in blocks 1 through 3.

(2) Regarding the Method of Calculating the Image Importance Degree

Figure 29:
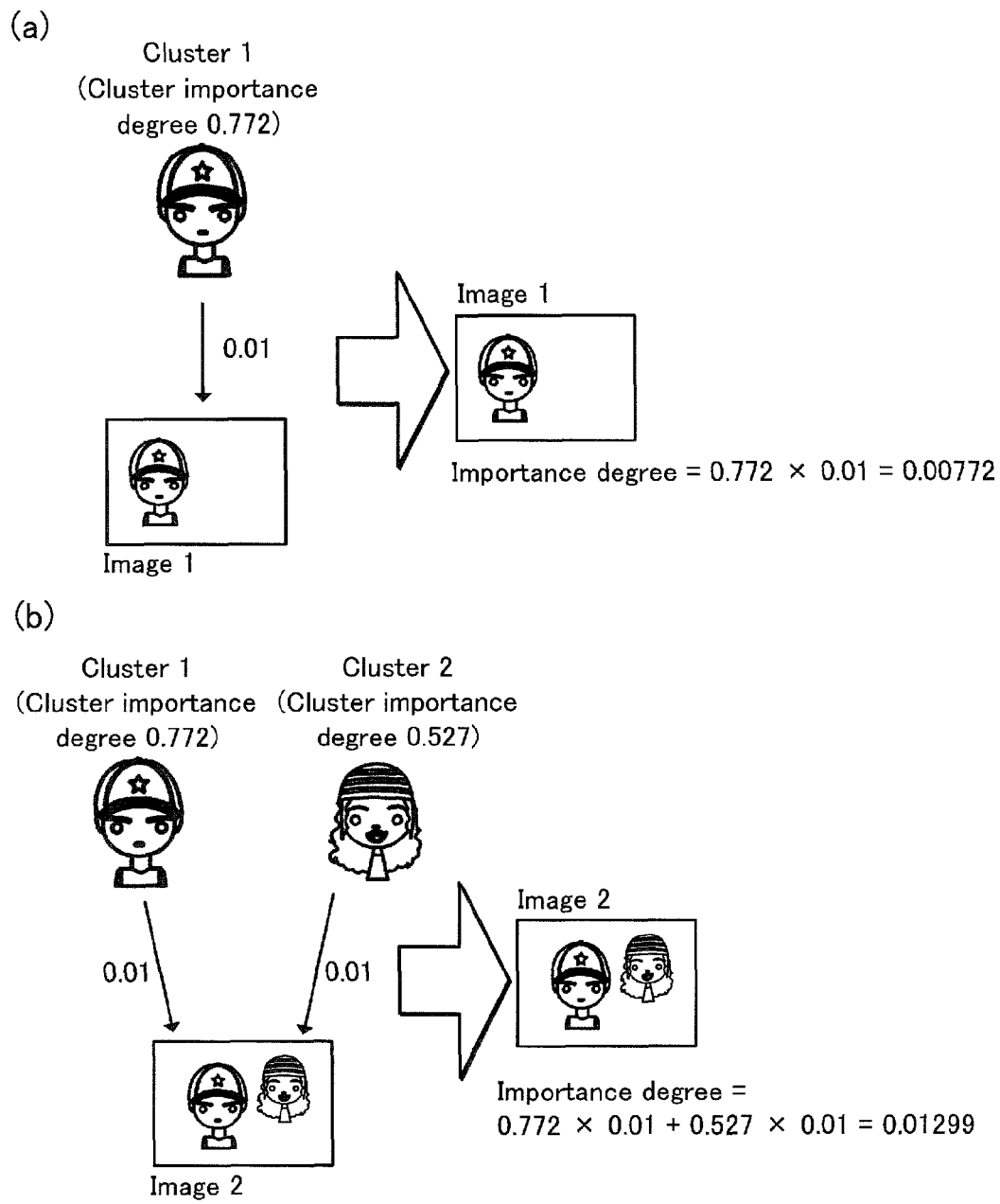
FIG. 29 illustrates a method for calculating image importance degrees from cluster importance degrees.

In FIG. 29, the method of calculating the image importance degree has been described as multiplying the importance degree of each cluster included in the image by a constant 0.01 for the link from the cluster to the image in order to calculate the importance degree of the image. The method of calculating the image importance degree is not, however, limited in this way.

For example, in order for the occupation degree of a person appearing in an image to be reflected in the image importance degree, the importance degree of each cluster included in the image may be multiplied by the occupation degree of the cluster in the image, as shown in FIG. 33.

By doing so, an image Y in which a person in cluster 1 appears larger than in image X can be assigned a higher importance degree.

(3) Regarding Clustering

In the above embodiments, the k-means method, which is a non-hierarchical method, is adopted as the method for clustering performed by the clustering unit 104. The clustering method is not, however, limited in this way. Instead, a hierarchical clustering method such as the Ward's method may be adopted.

(4) Regarding Objects

In the embodiments, an example of treating people's faces as objects has been described. Objects are not, however, limited to people, and faces of animals such as dogs (FIG. 4: image 10) and cats may be treated as objects from which image feature values are extracted. In addition, the objects appearing in the images are not limited to faces, and may be various other objects such as cars (FIG. 4: image 6), plants, buildings, and so forth.

(5) Regarding the Background Node

In Embodiment 2, an example of generating a graph with one background node for the background of all images has been described, but graph generation is not limited in this way. A plurality of background nodes may be created, or a graph having no background node may be created.

(6) Regarding Image Feature Values

In each of the embodiments, the occupation degree has been described as an example of image feature values, but image feature values are not limited in this way.

For example, in addition to occupation degree, the following may also be used as weights: a smile degree of a person, a person's facial orientation, or a degree of focus of the person.

An image with a higher smile degree may, for example, be assigned a higher image importance degree.

When weighting based on facial orientation, a calculation formula may be used to increase the image importance degree as the face comes closer to facing the front of the image.

When weighting based on the degree of focus of the person, the importance degree may, for example, be evaluated high when the person appears sharply in the image and low when the person appears blurred.

Furthermore, the importance degree of objects may be calculated without using the occupation degree at all, basing calculation instead on factors such as the smile degree, the facial orientation, or the degree of focus of the person.

In short, as long as the value indicates a characteristic of the appearance of the object in the image, a variety of values may be used, including and not limited to the occupation degree, the smile degree, and the facial orientation.

(7) Regarding Acquisition of Images

In the embodiments, images have been described as being acquired from the photography device 130, but acquisition is not limited in this way.

For example, images may be acquired from an external device, such as a mobile terminal. The connection between devices may be any of a variety of types, either wired (a LAN cable, a USB cable, or the like) or wireless (an infrared connection, a Bluetooth connection, or the like).

Images may also be acquired via a drive into which is mounted a removable recording medium such as a Smart Media, a Compact Flash™, a Memory Stick, an SD memory card, a multimedia card, a CD-R/RW, a DVD±R/RW, a DVD-RAM, an HD-DVD, and a BD (Blu-ray Disc).

(8) Integrated Circuit

The image evaluation apparatus of the embodiments may be typically implemented as an LSI (Large Scale Integration), which is a type of integrated circuit. Furthermore, each of the circuits may be separately integrated into a single chip, or the functions may be integrated into a single chip including a part or all of the circuits. Although referred to here as an LSI, depending on the degree of integration, the terms IC (Integrated Circuit), system LSI, super LSI, or ultra LSI are also used. In addition, the method for assembling integrated circuits is not limited to LSI, and a dedicated communication circuit or a general-purpose processor may be used. An FPGA (Field Programmable Gate Array), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(9) Program

It is possible to distribute a control program composed of program code for causing processors of various devices including computers and various circuits connected to the processors to execute the processing for image importance degree calculation described in the embodiments. The distribution of such a control program may be realized by recording the control program onto recording media, or by transmission via various communication channels.

The recording media which may be used in the distribution of the control program include a Smart Media, a Compact Flash™, a Memory Stick™, an SD memory card, a multimedia card, a CD-R/RW, a DVD±R/RW, a DVD-RAM, an HD-DVD, a BD (Blu-ray Disc), and the like.

The distributed control program is used by being stored on a processor-readable memory or the like and executed by the processor in order to achieve the various functions described in the embodiments.

INDUSTRIAL APPLICABILITY

The image management device of the present invention can be applied to devices that store still or moving images, digital cameras, photography devices such as movie cameras or mobile phones provided with a camera, PCs (Personal Computers), and the like.

REFERENCE SIGNS LIST 100 image management device
101 image acquisition unit
102 object detection unit
103 object feature value extraction unit
104 clustering unit
105 block generation unit
106 graph generation unit
107 storage unit
108 object information storage unit
109 block information storage unit
110 graph information storage unit
111 intra-block importance degree storage unit
112 image importance degree storage unit
113 cluster importance degree storage unit
114 assessment unit
115 probability transition matrix generation unit
116 intra-block importance degree calculation unit
117 importance degree normalization unit
118 cluster importance degree calculation unit
119 image importance degree calculation unit
120 display control unit
130 photography device
140 display device
400 image group
500 object information
700 block information
900 graph information for block 1
901 graph information for block 1
1100 probability transition matrix M
1200 random walk matrix X
1300 eigenvector
1400 eigenvector after conversion to probability vector
1500 intra-block importance degree information
1500 intra-block importance degree information for block 1
1701 intra-block importance degree for block 1 (after normalization)

1801 intra-block importance degree for clusters after subtraction of dummy node importance degree
2100 cluster importance degree information
2300 image importance degree information
2400 image ranking
2700 intra-block importance degrees after normalization using dummy node importance degree
3400 image management device (external device)

The invention claimed is:

1. An image management device for ranking a plurality of images based on importance degrees thereof, comprising:
a processor; and
a non-transitory memory having stored thereon executable instructions which, when executed, cause the processor to perform:
acquiring a plurality of images;
detecting, in each of the acquired images, any objects included therein;
extracting image feature values of each detected object;
categorizing each detected object into one of a plurality of clusters based on the image feature values of the detected objects;
generating a plurality of blocks by grouping images in which an object is detected;
calculating, for each of the blocks, an intra-block importance degree of each of the clusters to which an object in an image in the block belongs based on a relationship between the image and the cluster;
calculating a cluster importance degree of each of the clusters in the images by accumulating the intra-block importance degrees calculated for each of the clusters in each of the blocks; and
calculating an image importance degree of each of the images based on the calculated cluster importance degrees.

2. The image management device of claim 1, wherein, when executed, the executable instructions cause the processor to further perform:
assigning a block ID to each of the grouped images to identify the block into which each of the images is grouped;
storing the block ID assigned to each of the images; and
when images are newly acquired, grouping the newly acquired images into blocks without grouping images whose block ID is stored.

3. The image management device of claim 1, wherein, when executed, the executable instructions cause the processor to further perform:
assigning a block ID to each of the grouped images to identify the block into which each of the images is grouped;
storing the block ID assigned to each of the images; and
when images are newly acquired, grouping both a portion of the images whose block ID is stored and the newly acquired images into blocks.

4. The image management device of claim 1,
wherein, when executed, the executable instructions cause the processor to further perform
creating, for each block, an image node for each image in the block, a cluster node for each cluster to which each object in the image belongs, and a background node indicating a background of the image, setting a value for a link between each created node, and generating a graph from each created node and the value set for each link, and the intra-block importance degree of the image and the cluster of each node are calculated based on the generated graph.

5. The image management device of claim 4, wherein, when executed, the executable instructions cause the processor to further perform
generating a probability transition matrix based on the graph generated by the graph generation unit and calculating an eigenvector of the probability transition matrix for calculation, for each of the blocks, of the image importance degree and the intra-block importance degree of the clusters.

6. The image management device of claim 5, wherein, when executed, the executable instructions cause the processor to further perform
creating a dummy node for inclusion in the graph and setting the value of the link between the dummy node and each image node, between the dummy node and each cluster node, and between the dummy node and the background node to zero.

7. The image management device of claim 6, wherein, when executed, the executable instructions cause the processor to further perform
correcting the generated probability transition matrix based on a matrix indicated by a random walk and calculating the eigenvector of the corrected probability transition matrix.

8. The image management device of claim 7, wherein, when executed, the executable instructions cause the processor to further perform
adjusting the intra-block importance degree of each cluster in each block by subtracting the intra-block importance degree of the dummy node in the block from the intra-block importance degree of the cluster in the block.

9. The image management device of claim 7,
wherein, when executed, the executable instructions cause the processor to further perform:
normalizing the calculated intra-block importance degree of each cluster in each block based on the intra-block importance degree of the dummy node in each block, wherein
the cluster importance degrees in the images are calculated based on the normalized intra-block importance degree of each cluster.

10. The image management device of claim 1, wherein
the cluster importance degrees in the images are calculated by summing, for each cluster, the calculated intra-block importance degree of the cluster in each block.

11. The image management device of claim 10,
wherein, when executed, the executable instructions cause the processor to further perform:
normalizing the calculated cluster importance degrees in each block based on a total number of images and a total number of clusters included in the block, and
the cluster importance degrees in the images are calculated by summing the normalized cluster importance degrees.

12. The image management device of claim 1,
wherein, when executed, the executable instructions cause the processor to further perform
acquiring, from an external device, feature values of clusters categorized by the external device and comparing the acquired feature values with feature values of categorized clusters so as to identify a cluster, among the categorized clusters, to which the acquired feature values correspond, and
the cluster importance degree of the identified cluster is acquired from the external device and the acquired cluster importance degree is used during the accumulation of the intra-block importance degrees.

13. The image management device of claim 1, wherein, when executed, the executable instructions cause the processor to further perform
determining a size of each of the blocks to be generated based on resource information showing resources useable for block generation, and
each of the blocks are generated to be the determined size.

14. The image management device of claim 13, wherein the resource information indicates a size of available memory.

15. An image management method for ranking a plurality of images based on importance degrees thereof, the image management method being performed using a processor, and the image management method comprising the steps of:
acquiring a plurality of images;
detecting, in each of the acquired images, any objects included therein;
extracting image feature values of each detected object;
categorizing each detected object into one of a plurality of clusters based on the image feature values of the detected objects;
generating a plurality of blocks by grouping images in which an object is detected;
calculating, for each of the blocks, an intra-block importance degree of each of the clusters to which an object in an image in the block belongs based on a relationship between the image and the cluster;
calculating a cluster importance degree of each of the clusters in the images by accumulating the intra-block importance degrees calculated for each of the clusters in each of the blocks; and
calculating an image importance degree of each of the images based on the calculated cluster importance degrees.

16. A non-transitory computer readable recording medium having stored thereon a program for causing a computer to perform processing that includes image management steps, the image management steps comprising:
acquiring a plurality of images;
detecting, in each of the acquired images, any objects included therein;
extracting image feature values of each detected object;
categorizing each detected object into one of a plurality of clusters based on the image feature values of the detected objects;
generating a plurality of blocks by grouping images in which an object is detected;
calculating, for each of the blocks, an intra-block importance degree of each of the clusters to which an object in an image in the block belongs based on a relationship between the image and the cluster;
calculating a cluster importance degree of each of the clusters in the images by accumulating the intra-block importance degrees calculated for each of the clusters in each of the blocks; and
calculating an image importance degree of each of the images based on the calculated cluster importance degrees.

17. An integrated circuit for ranking a plurality of images based on importance degrees thereof, comprising:
a processor; and
a non-transitory memory having stored thereon executable instructions which, when executed, cause the processor to perform:
acquiring a plurality of images;
detecting, in each of the acquired images, any objects included therein;
extracting image feature values of each detected object;
categorizing each detected object into one of a plurality of clusters based on the image feature values of the detected objects;
generating a plurality of blocks by grouping images in which an object is detected;
calculating, for each of the blocks, an intra-block importance degree of each of the clusters to which an object in an image in the block belongs based on a relationship between the image and the cluster;
calculating a cluster importance degree of each of the clusters in the images by accumulating the intra-block importance degrees calculated for each of the clusters in each of the blocks; and
calculating an image importance degree of each of the images based on the calculated cluster importance degrees.

* * * * *